United States Patent
Guy

(10) Patent No.: US 10,466,863 B1
(45) Date of Patent: Nov. 5, 2019

(54) PREDICTIVE INSERTION OF GRAPHICAL OBJECTS IN A DEVELOPMENT ENVIRONMENT

(71) Applicant: Google Inc., Mountain View, CA (US)

(72) Inventor: Romain P. Guy, Millbrae, CA (US)

(73) Assignee: Google LLC, Mountain View, CA (US)

( * ) Notice: Subject to any disclaimer, the term of this patent is extended or adjusted under 35 U.S.C. 154(b) by 751 days.

(21) Appl. No.: 15/170,260

(22) Filed: Jun. 1, 2016

(51) Int. Cl.
*G06F 3/0482* (2013.01)
*G06F 8/38* (2018.01)
*G06F 8/33* (2018.01)
*G06F 3/0484* (2013.01)
*G06F 3/0488* (2013.01)
*G06F 8/00* (2018.01)

(52) U.S. Cl.
CPC ........ *G06F 3/0482* (2013.01); *G06F 3/04845* (2013.01); *G06F 3/04883* (2013.01); *G06F 8/38* (2013.01)

(58) Field of Classification Search
None
See application file for complete search history.

(56) References Cited

U.S. PATENT DOCUMENTS

| | | | |
|---|---|---|---|
| 5,404,441 A | 4/1995 | Satoyama | |
| 6,005,567 A | 12/1999 | Nielsen | |
| 6,246,403 B1 | 6/2001 | Tomm | |
| 6,323,884 B1 | 11/2001 | Bird et al. | |
| 6,476,828 B1 | 11/2002 | Burkett et al. | |
| 6,799,718 B2 * | 10/2004 | Chan | G06F 8/33 235/375 |
| 7,490,314 B2 * | 2/2009 | Yuknewicz | G06F 8/00 715/810 |
| 7,627,832 B2 | 12/2009 | Ludmann | |
| 8,341,536 B2 | 12/2012 | Mendel et al. | |
| 8,429,203 B2 * | 4/2013 | Perez | G06F 8/34 707/804 |

(Continued)

OTHER PUBLICATIONS

Nunes et al., "Automatic Generation of GUI from VDM++ Specifications," IARIA, ISBN: 978-1-61208-165-6, ICSEA Oct. 23-29, 2011: The Sixth International Conference on Software Engineering Advances, pp. 399-404.

*Primary Examiner* — Yongjia Pan
(74) *Attorney, Agent, or Firm* — Shumaker & Sieffert, P.A.

(57) ABSTRACT

An example method includes outputting, by a computing device and for display in a graphical development environment used during development of a software application, a graphical user interface associated with the software application, receiving, by the computing device, a development specification that associates a region of the graphical user interface with one or more candidate graphical objects for insertion into the graphical user interface, and receiving, by the computing device, an indication of a selection of the region of the graphical user interface. The example method further includes determining, by the computing device, based at least in part on the development specification and the indication of the selection of the region of the graphical user interface, a graphical object from the one or more candidate graphical objects, and outputting, by the computing device and for display at the region of the graphical user interface, an indication of the graphical object.

19 Claims, 11 Drawing Sheets

(56) References Cited

U.S. PATENT DOCUMENTS

| | | | | | |
|---|---|---|---|---|---|
| 8,448,089 B2* | 5/2013 | Li | ................. | G06N 20/00 | |
| | | | | 715/816 | |
| 8,694,960 B2 | 4/2014 | Bijani et al. | | | |
| 8,869,097 B2* | 10/2014 | Asadullah | ................. | G06F 8/33 | |
| | | | | 717/101 | |
| 2004/0031017 A1* | 2/2004 | Vaidyanathan | ........... | G06F 8/33 | |
| | | | | 717/110 | |
| 2004/0243977 A1* | 12/2004 | Shou | ................. | G06F 8/33 | |
| | | | | 717/112 | |
| 2004/0267690 A1* | 12/2004 | Bhogal | ................. | G06F 16/289 | |
| 2005/0091576 A1* | 4/2005 | Relyea | ................. | G06F 9/451 | |
| | | | | 715/211 | |
| 2005/0125773 A1* | 6/2005 | Hawley | ................. | G06F 8/33 | |
| | | | | 717/109 | |
| 2006/0101396 A1* | 5/2006 | Burke | ................. | G06F 8/71 | |
| | | | | 717/120 | |
| 2007/0073517 A1* | 3/2007 | Panje | ................. | G06F 16/4393 | |
| | | | | 702/181 | |
| 2007/0136267 A1* | 6/2007 | Hess | ................. | G06F 16/24575 | |
| 2009/0030902 A1* | 1/2009 | Aharoni | ................. | G06F 8/33 | |
| 2009/0199123 A1* | 8/2009 | Albertson | ........... | G06F 3/04845 | |
| | | | | 715/772 | |
| 2010/0083225 A1* | 4/2010 | Giat | ................. | G06F 8/33 | |
| | | | | 717/111 | |
| 2011/0072492 A1* | 3/2011 | Mohler | ................. | G06F 3/04817 | |
| | | | | 726/3 | |
| 2012/0047130 A1* | 2/2012 | Perez | ................. | G06F 8/34 | |
| | | | | 707/723 | |
| 2012/0137268 A1* | 5/2012 | Dattke | ................. | G06F 8/38 | |
| | | | | 717/105 | |
| 2014/0237449 A1* | 8/2014 | Hey | ................. | G06F 8/73 | |
| | | | | 717/123 | |
| 2015/0058800 A1 | 2/2015 | Sweeney et al. | | | |
| 2015/0186193 A1* | 7/2015 | Jain | ................. | G06F 9/541 | |
| | | | | 719/328 | |
| 2016/0062745 A1* | 3/2016 | Rao | ................. | G06F 8/33 | |
| | | | | 717/109 | |
| 2016/0188298 A1* | 6/2016 | Vandikas | ........... | G06Q 10/063 | |
| | | | | 717/105 | |

* cited by examiner

PREDICTIVE INSERTION OF GRAPHICAL OBJECTS IN A DEVELOPMENT ENVIRONMENT

BACKGROUND

Software application developers often create user interfaces for one or more software applications using tools that are provided within a development environment. These tools often provide a "what you see is what you get" environment for building a graphical user interface, which allows an application developer to manually select and position graphical objects within the graphical user interface. These graphical objects are often constrained in one or more ways. For example, the objects (e.g., buttons, checkboxes) may be constrained in size and/or position within the graphical user interface.

SUMMARY

In one example, a method includes outputting, by a computing device and for display in a graphical development environment that is used during development of a software application, a graphical user interface that is associated with the software application, receiving, by the computing device, a development specification that associates a region of the graphical user interface with one or more candidate graphical objects for insertion into the graphical user interface, and receiving, by the computing device, an indication of a selection of the region of the graphical user interface. The example method further includes determining, by the computing device, based at least in part on the development specification and on the indication of the selection of the region of the graphical user interface, a graphical object from the one or more candidate graphical objects, and outputting, by the computing device and for display at the region of the graphical user interface, an indication of the graphical object.

In one example, a computing device includes at least one processor and a computer-readable storage device. The computer-readable storage device stores instructions that, when executed by the at least one processor, cause the at least one processor to output, for display in a graphical development environment that is used during development of a software application, a graphical user interface that is associated with the software application, receive a development specification that associates a region of the graphical user interface with one or more candidate graphical objects for insertion into the graphical user interface, and receive an indication of a selection of the region of the graphical user interface. The instructions, when executed by the at least one processor, further cause the at least one processor to determine, based at least in part on the development specification and on the indication of the selection of the region of the graphical user interface, a graphical object from the one or more candidate graphical objects, and output, for display at the region of the graphical user interface, an indication of the graphical object.

In one example, a computer-readable storage device stores instructions that, when executed by at least one processor of a computing device, cause the at least one processor to perform operations including outputting, for display in a graphical development environment that is used during development of a software application, a graphical user interface that is associated with the software application, receiving a development specification that associates a region of the graphical user interface with one or more candidate graphical objects for insertion into the graphical user interface, and receiving an indication of a selection of the region of the graphical user interface. The operations further include determining, based at least in part on the development specification and on the indication of the selection of the region of the graphical user interface, a graphical object from the one or more candidate graphical objects, and outputting, for display at the region of the graphical user interface, an indication of the graphical object.

The details of one or more examples are set forth in the accompanying drawings and the description below. Other features, objects, and advantages of the disclosure will be apparent from the description and drawings, and from the claims.

DETAILED DESCRIPTION

In general, this disclosure is directed to techniques for enabling a computing device to predictively determine graphical objects that may be inserted into a graphical user interface in a development environment. Using information that may be related to the aforementioned guidelines, space constraints, and/or usability constraints, the computing device may be configured to assist an application developer by automatically identifying one or more graphical objects that can be inserted into the graphical user interface based on one or more factors, such as the current position of a pointer and/or or the position of other graphical objects within the graphical user interface. In various examples, the computing device is configured to predict not only to predict the type, position, and/or size of graphical objects that may be inserted into the graphical user interface, but also to predict one or more further constraints of these objects, such as the alignment of the objects within the graphical user interface in general or with respect to other objects.

Thus, in many cases, the computing device may enable an application developer to create user interfaces within a development environment much more quickly, and in a less burdensome manner, than through the use of the traditional environments described above. Furthermore, by determining one or more constraints of objects that are to be inserted, the use of the techniques described herein may enable an application developer to save potentially significant amounts of time when developing software applications, as well as potentially removing various potentially error-prone steps of manually designing and building user interfaces for these applications. As a result, in various examples, the computing device (e.g., one or more processors) may be operable to process fewer user inputs by the application developer, such that the computing device potentially consumes less operating power. In addition, the execution or run time within the development environment may potentially be shortened and/or more efficient, which may free up processing and/or resources for use by other applications executed by the computing device.

Figure 1:
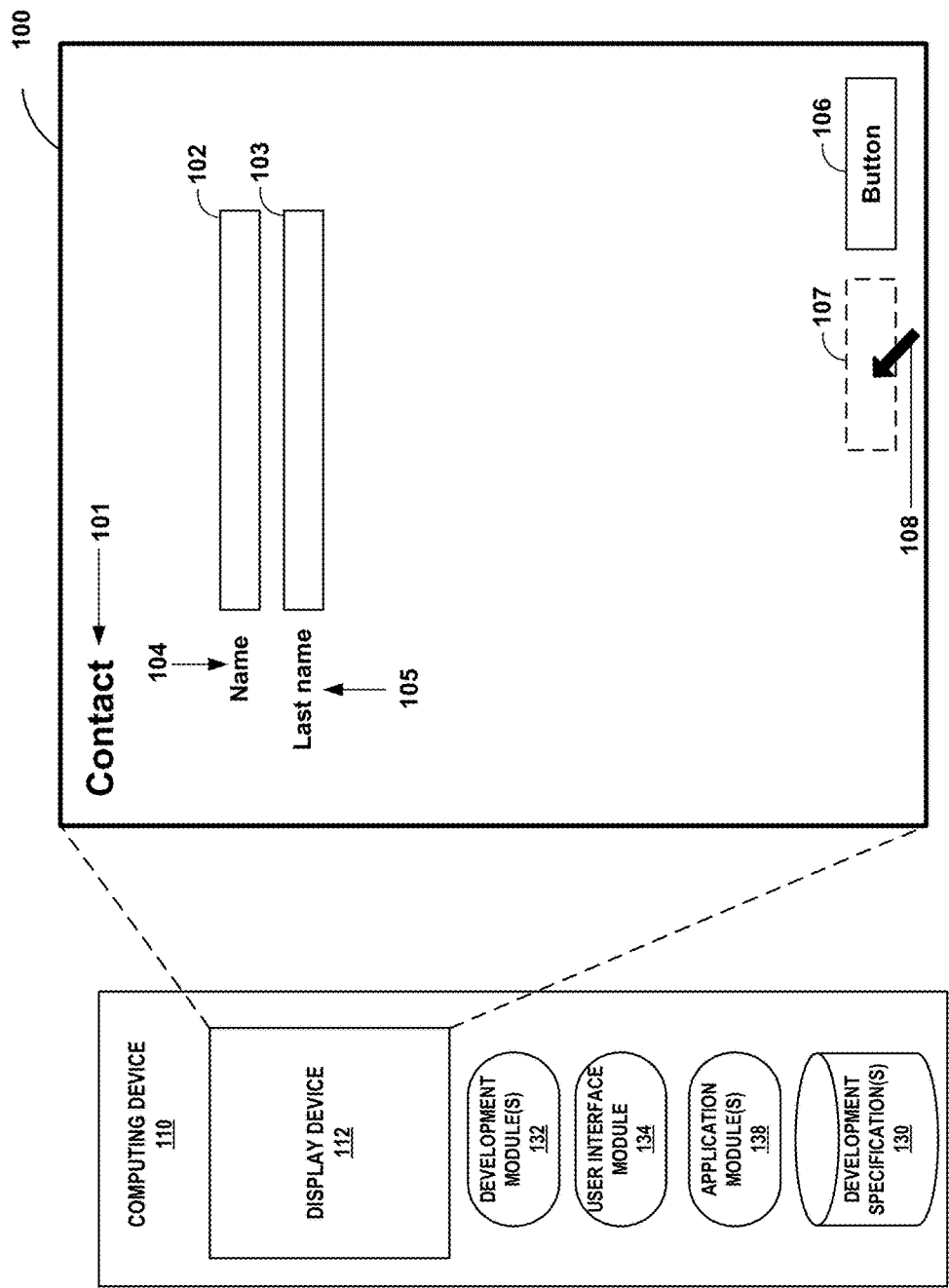
FIG. 1 is a conceptual diagram illustrating an example computing device that is configured to insert one or more graphical objects into a graphical user interface in a development environment, in accordance with one or more aspects of the present disclosure.

FIG. 1 is a conceptual diagram illustrating an example computing device 110 that is configured to insert one or more graphical objects (e.g., graphical object 107) into a graphical user interface in a development environment, in accordance with one or more aspects of the present disclosure. Computing device 110 may represent a mobile device, such as a smart phone, a tablet computer, a laptop computer, a computerized watch, computerized eyewear, computerized gloves, a personal computer, a smart television, or any other type of computing device. For example, non-limiting examples of computing device 110 include desktop computers, televisions, personal digital assistants, portable gaming systems, media players, mobile television platforms, automobile navigation and entertainment systems, vehicle (e.g., automobile, aircraft, or other vehicle) cockpit displays, or any other types of wearable, non-wearable, mobile, or non-mobile computing devices that may output a graphical user interface for display.

Computing device 110 includes a display device 112, one or more development modules 132, a user interface module 134, one or more application modules 138, and one or more development specifications 130. Modules 132, 134, and 138 may perform operations described using software, hardware, firmware, or a mixture of hardware, software, and firmware residing in and/or executing at computing device 110. For example, one or more processors of computing device 110 may execute instructions that are stored at a memory or other non-transitory storage device of computing device 110 to perform the operations of modules 132, 134, and 138. Computing device 110 may execute modules 132,134, and 138 as virtual machines executing on underlying hardware. As other examples, modules 132, 134, and 138 may execute as one or more services of an operating system or computing platform, or modules 132, 134, and 138 may execute as one or more executable programs at an application layer of a computing platform.

Display device 112 may function as an output device, such as a liquid crystal display (LCD), a dot matrix display, a light-emitting diode (LED) display, an organic light-emitting diode (OLED) display, an e-ink device, or similar monochrome or color displays capable of outputting visible information to a user of computing device 110. In some examples, display device 112 of computing device 110 may comprise a presence-sensitive display that may include respective input and/or output functionality for computing device 110. In these examples, display device 112 may be implemented using various technologies. For instance, display device 112 may function as an input device using a presence-sensitive input screen, such as a resistive touchscreen, a surface acoustic wave touchscreen, a capacitive touchscreen, a projective capacitance touchscreen, a pressure-sensitive screen, an acoustic pulse recognition touchscreen, or another presence-sensitive display technology.

In examples where display device 112 comprises a presence-sensitive display device, display device 112 may detect input (e.g., touch and non-touch input) from a user of computing device 110. Display device 112 may detect input by detecting one or more gestures from a user (e.g., the user touching, pointing, and/or swiping at or near one or more locations of display device 112 with a finger or a stylus pen). Display device 112 may output information to a user in the form of a user interface (e.g., graphical user interface 100), which may be associated with functionality provided by computing device 110. Such user interfaces may be associated with computing platforms, operating systems, applications, and/or services executing at or accessible from computing device 110 (e.g., electronic message applications, chat applications, Internet browser applications, mobile or desktop operating systems, social media applications, electronic games, and other types of applications). For example, display device 112 may present user graphical interface 100 which, as shown in FIG. 1, is a user interface of a particular application of application modules 138 executing at computing device 110 and includes various graphical elements displayed at various locations of display device 112.

As indicated in FIG. 1, computing device 110 includes one or more development modules 132, a user interface module 134, one or more application modules 138, and one or more development specifications 130. A user of computing device 110, such as a software application developer, may use development modules 132 to create user interfaces for one or more of application modules 138, which may comprise one or more software applications. Development modules 132 may be executable by one or more processors of computing device 110 to provide a development environment in which an application developer may create application modules 138. In various examples, application modules 138 may also be executable by the one or more processors of computing device 110 to provide the run-time functionality associated with application modules 138. In certain examples, an application developer may use development modules 132 on computing device 110 to create application modules 138, and these application modules 138 may then be executed by one or more other computing devices external to computing device 110. In these examples, computing device 110 may comprise an application development device, while the other computing devices that are external to computing device 110 may be the run-time devices that are configured to execute application modules 138 at runtime. Non-limiting examples of application modules 138 may include electronic message applications, chat applications, Internet browser applications, mobile or desktop operating systems, social media applications, electronic games, and other types of applications.

Development specifications 130 may include one or more rules, guidelines, or other specifications that are used by development modules 132 during application development. In many cases, development specifications 130 may include one or more domain- or application-specific specifications that are based on a particular application domain, runtime environment, and/or type, as will be described in further detail below.

User interface module 134 may be configured to manage user interactions with display device 112 and other components of computing device 110. For example, user interface module 134 may act as an intermediary between various components of computing device 110 to make determinations based on user input (e.g., user input detected by display device 112), and to generate output at display device 112, e.g., in response to the user input. User interface module 134 may receive instructions from an application, service, platform, or other module of computing device 110 (e.g., from development modules 132 and/or application modules 138) to cause display device 112 to output a user interface (e.g., graphical user interface 100 shown in FIG. 1). User interface module 134 may manage inputs received by computing device 110 as a user views and interacts with the user interface presented at display device 112 and update the user interface in response to receiving additional instructions from the application, service, platform, or other module of computing device 110 that is processing the user input. User interface module 134 may be further configured to receive user input from a user of computing device 110 and provide one or more indications of such input to an application, service, platform, or other module of computing device 110 (e.g., to development modules 132 and/or application modules 138).

During execution, development modules 132 may output, for display at display device 112 (e.g., using user interface module 134), a graphical development environment that may be used by an application developer during development of a software application (e.g., one of application modules 138). Development modules 132 may also output, for display in this graphical development environment, a graphical user interface that is associated with the software application, such as graphical user interface 100 shown in FIG. 1. As one example, an application developer may utilize development modules 132 to develop a software application that manages contact information for one or more contacts of a user. In this example, such as shown in FIG. 1, graphical user interface 100 is associated with this particular software application, and the application developer may interact with graphical user interface 100 while developing this application.

In this example where graphical user interface 100 is associated with an application that manages contact information, graphical user interface 100 may include various graphical objects that are associated with such contact information. FIG. 1 shows example graphical objects 101, 102, 103, 104, 105, 106, and 107 that may be included within graphical user interface 100. An application developer may manually insert one or more of these graphical objects into graphical user interface 100, while computing device 110 may also be configured to automatically determine that one or more of these graphical objects may be inserted into graphical user interface based at least in part, for example, on a position of pointer 108. For example, development modules 132 may receive one or more development specifications 130 for use with the graphical development environment. Development specifications 130 may associate a region of graphical user interface 100 with one or more candidate graphical objects for insertion. Development modules 132 may determine the region in which pointer 108 is located and predict, based on the region and development specifications 130, the one or more candidate graphical objects associated with the region.

As will be described in further detail below, development modules 132 may receive an indication of a selection of the region of graphical user interface 100 (e.g., a region that includes a current location of pointer 108) and determine, based at least in part on development specification 130 and on the indication of the selection of the region of graphical user interface 100, a graphical object (e.g., graphical object 107) from the one or more candidate graphical objects. Development modules 132 may then output, for display at the region of graphical user interface 100 (e.g., using user interface module 134) an indication of the graphical object.

In some examples, computing device 110 may automatically insert one or more graphical objects (e.g., graphical object 107) based at least, for example, on the position of pointer 108, without receiving any further user input. In other examples, computing device 110 may identify these one or more graphical objects for insertion, and may proceed with insertion of these objects upon receiving further user input (e.g., confirmation).

In the example of FIG. 1, graphical object 101 is a name associated with the form provided by graphical user interface 100. In this case, the name associated with the form is "Contact," given that the form is associated with a contact manager. Graphical object 102 is a text input field associated with graphical object 104, where graphical object 104 is a text label "Name" that corresponds to a first name of a contact. Graphical object 103 is a text input field associated with graphical object 105, where graphical object 105 is a text label "Last name" that corresponds to a last name of the contact. During execution of an application that is associated with graphical user interface 100, a user may, at runtime, input the first and last names of a given contact using input fields 102 and 103. Graphical object 106 is a graphical button that is located at the lower-right region of graphical user interface.

While interacting with graphical user interface 100, the application developer may move pointer 108 (e.g., a cursor) to one or more locations within graphical interface 100. As shown in FIG. 1, pointer 108 is at a bottom region of graphical user interface 100, positioned to the left of, and adjacent to, graphical object 106. Based on one or more factors, development modules 132 may be configured to automatically determine, or predict, that the application developer may want to insert a new graphical object at a region of graphical user interface 100 that includes or is otherwise associated with the location of pointer 108.

For example, as shown in FIG. 1, development modules 132 may predict that the application developer may wish to insert graphical object 107, shown in dotted lines within FIG. 1, into graphical user interface 100. In various cases, development modules 132 may predict the insertion of graphical object 107 based at least in part on the location of pointer 108 within graphical user interface. For example, development modules 132 may receive or otherwise utilize one or more of development specifications 130, for use with the graphical development environment provided by development modules 132, to determine that graphical object 107 may be inserted at a region of graphical user interface 100 that includes the location of pointer 108.

Development specifications 130 may provide guidelines or rules associated with the layout of graphical user interface 100 and/or the software application associated with graphical user interface 100. For instance, development specifications 130 may include guidelines for the design specifications of graphical user interface 100 for a particular software application or type of software application (e.g., a software application that manages contact information). In some cases, development specifications 130 may include guidelines for the design specifications of graphical user interface 100 that are tailored, or customized, for a particular form factor of computing device 110 (e.g., a tablet, television, smartphone).

Development specifications 130 may associate one or more regions of graphical user interface 100 with respective one or more candidate graphical objects that may be inserted into the graphical user interface 100 at the respective one or more regions. The associations indicated by development specifications 130 may be based on the particular locations included within these regions of graphical user interface 100, and may, in some cases, also be based on the existence and positioning of other graphical objects within graphical user interface 100.

Development specifications 130 may provide one or more indications of candidate graphical objects that may be commonly used at one or more regions within graphical user interface 100, or that may be commonly paired with one or more other (e.g., adjacent) graphical objects at particular locations within the graphical user interface 100. Development modules 132 may use development specifications 130 to identify such candidate objects and also suggested insertion locations for these objects based, for example, on the current location of pointer 108 within graphical user interface 100.

For example, development specifications 130 may identify a particular candidate object for possible insertion into graphical user interface 100 based on the current location of pointer 108. Development specifications 130 may include one or more rules or guidelines indicating that certain candidate graphical objects are often inserted at certain regions of a graphical user interface for a particular application, such as within graphical user interface 100. If the current location of pointer 108 is moved into one of these regions of graphical user interface 100, development modules 132 may use development specifications 130 to identify corresponding graphical objects as predicted objects that a user (e.g., application developer) may wish to insert into graphical user interface 100. In some cases, development specifications 130 may further identify a candidate object that may be commonly paired with another, existing object in graphical user interface 100. For example, development specifications 130 may identify that certain buttons (e.g., "OK" and "CANCEL" buttons) are routinely included together within graphical user interface 100. If one of these buttons currently exists in graphical user interface 100, and the application developer moves pointer 100 to a region that is adjacent to this existing button, development specifications 130 may identify a second button as a candidate object for insertion adjacent to the existing button. In this fashion, development specifications 130 may identify a type and a possible insertion location of respective candidate objects that may be inserted into graphical user interface 100 based, for example, on a current location of pointer 108 and/or the existence of adjacent objects that are frequently paired with these candidate objects in graphical user interface 100.

Furthermore, as noted above, development specifications 130 may include guidelines for the design specifications of associated with a particular software application or type of software application (e.g., a software application that manages contact information). In some cases, development specifications 130 may be tailored, or customized, for a particular form factor of computing device 110 (e.g., a tablet, television, smartphone).

In one example, based at least in part on an indication of a selection of a region of graphical user interface 100 (e.g., a positioning by the application developer of pointer 108 at a location within this region of graphical user interface 100), development modules 132 may determine, using the development specifications 132, a particular graphical object from a group of candidate graphical objects for insertion at this region. In the example of FIG. 1, once the application developer has positioned pointer 108 at the indicated location, development modules 132 may use development specifications 130 to determine any candidate graphical objects that are associated with the region of graphical user interface 100 that includes the location of pointer 108. As will be described in further detail below, the size of this region may vary and can be specified, for example, by development modules 132 and/or development specifications 130.

As shown in FIG. 1, based on the determination of the location of pointer 108 and further based on the information contained in development specifications 130, development modules 132 may identify graphical object 107 as a candidate graphical object for insertion at the region of graphical user interface 100 indicated in FIG. 1. Development specifications 130 may, for instance, identify graphical object 107 based on guidelines indicating that this particular graphical object (e.g., an "OK" button or a "CANCEL" button) is typically inserted in graphical user interface 100 (e.g., for this particular example software application) at a region of graphical user interface 100 that include the location at which pointer 108 is currently located. Thus, rather than the application developer having to manually select graphical object 107, development modules 132 may be configured to automatically select graphical object 107.

In some examples, development modules 132 may automatically insert graphical object 107 into graphical user interface 100. In other examples, development modules 132 may first provide an indication of graphical object 107 within graphical user interface 100 as a suggestion for insertion at the region that includes the location of pointer 108. For instance, as shown in FIG. 1, development modules 132 may output an indication of graphical object 107 as a suggested object for insertion by outputting dashed lines around the perimeter of graphical object 107 (e.g., a "ghost" representation, or preview, of the object), indicating that graphical object is a candidate or suggested object for insertion at the indicated region of graphical user interface 100.

The application developer may then, in certain examples, either confirm or reject this proposed suggestion. For example, the application developer may provide an additional user input to confirm or reject the proposed suggestion. Non-limiting examples of such additional user input may include a keypress, a mouse button click, a menu selection using development modules 132, a button activation of computing device 110, a tactile activation of computing 110, an audible activation of computing device 110, or another touch or non-touch input gesture. If the application developer rejects the suggested object insertion, the indication of graphical object 107 may disappear, and the application developer may continue to work and move pointer 108 within graphical user interface 100. On the other hand, if the application developer confirms and accepts the suggested object insertion, development modules 132 may proceed to insert graphical object 107 at the region indicated in FIG. 1, and may replace the dashed lines with solid lines around the perimeter of graphical object 107 to indicate that it has been inserted into graphical user interface 100.

In some examples, as will be described in further detail below, development modules 132 may further base its determination on one or more candidate objects for insertion within respective regions of graphical user interface 100 on the existence and position of additional (e.g., adjacent) graphical objects in graphical user interface 100. In the example of FIG. 1, for instance, development modules 132 may further base its determination to suggest graphical object 107 as a candidate for insertion on the existence and position of graphical object 106 within graphical user interface. Development specifications 130 may include one or more guidelines to indicate that graphical object 107 is a candidate object for insertion if pointer 108 is located within a particular region of graphical user interface 100 that is adjacent to, and to the left of, graphical object 106. Using these guidelines, development module 132 may determine that pointer 108 is currently positioned at a location within this region that is positioned adjacent to, and to the left of (e.g., within a threshold distance or region to the left of), graphical object 106. Upon making this determination, based on the guidelines included in development specifications 130, development modules 132 may determine that graphical object 107 is a candidate for insertion at the region indicated in FIG. 1. Additional description of the use of development specifications will be provided in further detail below.

Techniques described herein may enable computing device 110 to predictively determine graphical objects that may be inserted into a graphical user interface (e.g., graphical user interface 100 shown in FIG. 1) of a development environment. As a result, an application developer may not necessarily need to manually insert one or more graphical objects each time the developer wishes to create a new graphical user interface for a software application. Instead, using information that may be included in development specifications 130, computing device 110 may be configured to assist an application developer by automatically identifying one or more of such objects that can be inserted into the graphical user interface based on one or more factors, such as the current position of a pointer and/or or the position of other graphical objects within the graphical user interface. Furthermore, as will be described in further detail below, in various examples, computing device 110 may be configured not only to predict the type, position, and/or size of graphical objects that may be inserted into the graphical user interface, but also one or more further constraints of these objects, such as the alignment of the objects within the graphical user interface in general or with respect to other objects.

As a result, computing device 110 may enable an application developer to create user interfaces within a development environment potentially much more quickly, and in a less burdensome manner, than through the use of traditional development environments. Furthermore, by determining one or more constraints of objects that are to be inserted, the use of the techniques described herein may enable an application developer to save potentially significant amounts of time when developing software applications, as well as potentially removing various potentially error-prone steps of manually designing and building user interfaces for these applications. In addition, although development modules 132 use development specifications 130 to identity candidate graphical objects for insertion, an application developer does not necessarily need to have any detailed knowledge of the information (e.g., guidelines or rules) contained in these development specifications 130, thereby enabling the developer to more quickly and easily create user interfaces for one or more applications using development modules 132.

Figure 2:
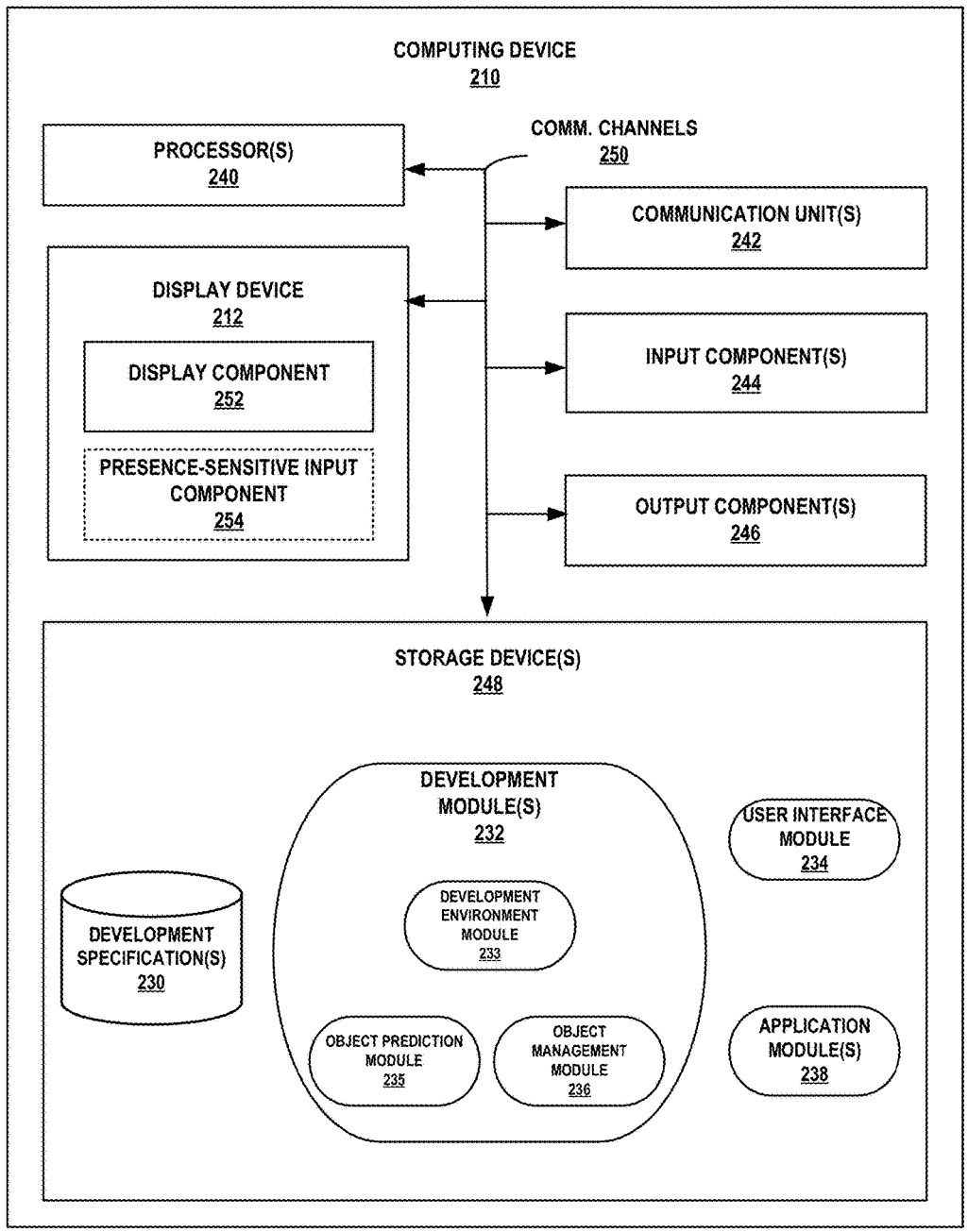
FIG. 2 is a block diagram illustrating further details of an example computing device, in accordance with one or more aspects of the present disclosure.

FIG. 2 is a block diagram illustrating an example computing device 210, in accordance with one or more aspects of the present disclosure. FIG. 2 illustrates only one particular example of computing device 210, and many other examples of computing device 210 may be used in other instances and may include a subset of the components included in example computing device 210 or may include additional components not shown in FIG. 2. As one non-limiting example, computing device 210 may be one example of computing device 110 shown in FIG. 1.

As shown in the example of FIG. 2, computing device 210 includes display device 212, one or more processors 240, one or more communication units 242, one or more input components 244, one or more output components 246, and one or more storage devices 248. Display device 212 includes display component 252 and, in certain examples, may also include a presence-sensitive input component 254 (e.g., when display device comprises a presence-sensitive display device). Storage devices 248 of computing device 210 include one or more development specifications 230, one or more development modules 232, user interface module 234, and one or more application modules 238. Communication channels 250 may interconnect each of the 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g., an Ethernet card), an optical transceiver, a radio frequency transceiver, a global positioning satellite (GPS) receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, may include a presence-sensitive input device (e.g., a touch-sensitive screen), mouse, keyboard, voice responsive system, video camera, microphone or any other type of device for detecting input from a human or machine. In some examples, input components 244 may include one or more sensor components one or more location sensors (GPS components, Wi-Fi components, cellular components), one or more temperature sensors, one or more movement sensors (e.g., accelerometers, gyroscopes), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 110 may generate output. Examples of output are tactile, audio, and video output. Output components 246 of computing device 210, in one example, includes a PSD, sound card, video graphics adapter card, speaker, cathode ray tube (CRT) monitor, liquid crystal display (LCD), or any other type of device for generating output to a human or machine.

Display device 212 of computing device 210 may be similar to display device 112 of computing device 110 and includes display component 252 and, in some cases, presence-sensitive input component 254. Display component 252 may be a screen at which information is displayed by display device 212, and, when included in display device 212 (e.g., when display device comprises a presence-sensitive display device), presence-sensitive input component 254 may detect an object at and/or near display component 252. As one example range, presence-sensitive input component 254 may detect an object, such as a finger or stylus, which is within two inches or less of display component 252. Presence-sensitive input component 254 may determine a location (e.g., an [x, y] coordinate) of display component 252 at which the object was detected. In another example range, presence-sensitive input component 254 may detect an object six inches or less from display component 252. Other ranges are also possible. Presence-sensitive input component 254 may determine the location of display component 252 selected by a user's finger using capacitive, inductive, and/or optical recognition techniques. In some examples, presence-sensitive input component 254 also provides output to a user using tactile, audio, or video stimuli as described with respect to display component 252. In the example of FIG. 2, display device 212 may present a user interface (such as graphical user interface 100 of FIG. 1).

While illustrated as an internal component of computing device 210, display device 212 may also represent an external component that shares a data path with computing device 210 for transmitting and/or receiving input and output. For instance, in one example, display device 212 represents a built-in component of computing device 210 located within and physically connected to the external packaging of computing device 210 (e.g., a screen on a mobile phone). In another example, display device 212 represents an external component of computing device 210 located outside and physically separated from the packaging or housing of computing device 210 (e.g., a monitor, a projector, which shares a wired and/or wireless data path with computing device 210).

In examples where display device 212 comprises a presence-sensitive display, display device 212 may detect two-dimensional and/or three-dimensional gestures as input from a user of computing device 210. For instance, a sensor of display device 212 may detect a user's movement (e.g., moving a hand, an arm, a pen, a stylus) within a threshold distance of the sensor. Display device 212 may determine a two- or three-dimensional vector representation of the movement and correlate the vector representation to a gesture input (e.g., a hand-wave, a pinch, a clap, a pen stroke) that has multiple dimensions. In other words, display device 212 can detect a multi-dimension gesture without necessarily requiring the user to gesture at or near a screen or surface at which display device 212 outputs information for display. Instead, display device 212 can detect a multi-dimensional gesture performed at or near a sensor, which may or may not be located near the screen or surface at which display device 212 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 232, 234, and 238 may be operable by processors 240 to perform various actions, operations, or functions of computing device 210. For example, processors 240 of computing device 210 may retrieve and execute instructions stored by storage devices 248 that cause processors 240 to perform the operations of modules 232, 234, and 238. The instructions, when executed by processors 240, may cause computing device 210 to store information within storage devices 248.

One or more storage devices 248 may store information for processing during operation of computing device 210 (e.g., computing device 210 may store data accessed by modules 232, 234, and 238 during execution at computing device 210). In some examples, storage devices 248 may include a temporary memory. Storage devices 248 may, in some examples, be at least partially configured for short-term storage of information as volatile memory. Examples of volatile memories include random access memories (RAM), dynamic random access memories (DRAM), static random access memories (SRAM), and other forms of volatile memories known in the art.

Storage devices 248, in some examples, also include one or more computer-readable storage media. Storage devices 248, in some examples, include one or more non-transitory computer-readable storage media. Storage devices 248 may be configured to store larger amounts of information than typically stored by volatile memory. Storage devices 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or information (e.g., data) associated with modules 232, 234, and 238. Storage components 248 may include a memory configured to store data or other information associated with modules 232, 234, and 238.

In FIG. 2, development specifications 230 may be similar to development specifications 130 shown in FIG. 1. Additionally, development modules 232, user interface module 234, and application modules 238 may include functionality that is similar to that of development modules 132, user interface module 134, and application modules 138, respectively, as shown in FIG. 1. User interface module 234 may perform functions to manage user interface interactions that occur during execution of other modules, such as development modules 232 and/or application modules 238. For example, user interface module 234 may receive indications of user input from development modules 232 and/or application modules 238, and may transmit display commands and/or data over communication channels 250 to cause display device 212 to present a user interface (e.g., graphical user interface 100) at display device 212. In some cases, user interface module 234 may also transmit display commands or data to development modules 232 and/or application modules 238.

In some examples, user interface module 234 may receive an indication of one or more user inputs detected at display device 212 (e.g., when display device 212 comprises a presence-sensitive display), and may output information about the user inputs to development modules 232 and/or application modules 238. For example, display device 212 may detect a user input and send data about the user input to user interface module 234 over communications channels 250. User interface module 234 may generate one or more touch events based on the detected input. A touch event may include information that characterizes user input, such as a location component (e.g., [x,y] coordinates) of the user input, a time component (e.g., when the user input was received), a force component (e.g., an amount of pressure applied by the user input), or other data (e.g., speed, acceleration, direction, density) about the user input.

Application modules 238 may comprise one example of application modules 238 shown in FIG. 1. Application modules 238 may represent various individual applications and services executing at and accessible from computing device 210. Numerous non-limiting examples of application modules 224 may exist and include a contact manager application, a fitness application, a calendar application, a personal assistant or prediction engine, a search application, a map or navigation application, a transportation service application (e.g., a bus or train tracking application), a social media application, a game application, an e-mail application, a chat or messaging application, an Internet browser application, or any and all other applications that may execute at computing device 210.

Development specifications 230 and development modules 232 may comprise examples of development specifications 130 and development modules 132, respectively, shown in FIG. 1. For example, development specifications 230 may include one or more rules, guidelines, or other specifications that are used by development modules 232 during application development. In many cases, development specifications 230 may include one or more domain- or application-specific specifications that are based on a particular application domain, runtime environment, and/or type. For example, development specifications 230 may include guidelines for the design specifications of a graphical user interface (e.g., graphical user interface 100) for a particular software application or type of software application. In some cases, development specifications 230 may be tailored, or customized, for a particular form factor of computing device 210 (e.g., a tablet, television, smartphone).

A user of computing device 210, such as a software application developer, may use development modules 232 to create user interfaces for one or more of application modules 238, which may comprise one or more software applications. Development modules 232 may be executable by processors 240 to provide a development environment in which an application developer may create application modules 238. Application modules 238 may be executed by processors 240 of computing device 210, but may also be executed by one or more other computing devices external to computing device 210.

As shown in the example of FIG. 2, development modules 232 include a development environment module 233, an object prediction module 235, and an object management module 236. Development environment module 233 may provide the development environment in which the application developer may create application modules 238. As shown in the examples illustrated in FIGS. 4A-4G, for instance, development environment module 233 may provide a user interface that includes functionality to build a graphical user interface (e.g., graphical user interface 400) for a software application.

In various examples, development environment module 233 may provide a tool that outputs a group (e.g., palette) of selectable, candidate objects that may be inserted into a graphical user interface. Development environment module 233 may receive user input to manipulate and/or manage these graphical objects within the graphical user interface, such as user input to adjust the width or height of an object or to associate particular text with the object. Development environment module 233 may also receive user input to adjust the margins (e.g., top margin, bottom margin, left margin, right margin) of a particular workspace and/or graphical user interface associated with an application. Additionally, development environment module 233 may provide various graphical menus within the graphical environment (e.g., File, Edit, View, Insert menus), as well as provide one or more file operations to manage files for the development environment (e.g., file operations to create, open, or save files).

Object management module 236 may manage graphical objects for use within a development environment provided by development environment module 233. Object management module 236 may manage the creation, insertion, movement, modification, and/or view of graphical objects, either automatically or based on user input. For example, during interaction with development environment module 233 and/or object prediction module 235, object management module 236 is capable of automatically creating, inserting, moving, modifying, or managing the view of graphical objects. In addition, based on user input (e.g., input from an application developer), object management module 236 is also capable of creating, inserting, moving, modifying, or managing the view of graphical objects. Non-limiting examples of such graphical objects include graphical buttons, checkboxes, labels, input fields, and date selectors.

Object prediction module 235 is configured to predict insertion of graphical objects. Responsive to determining that a graphical object is to be inserted at a region of a graphical user interface (e.g., graphical user interface 100), object prediction module 235 may communicate with object management module 236 to cause an automatic insertion of the graphical object. Object prediction module 235 may utilize development specifications 230 when predicting object insertion. Development specifications 230 may associate regions of a graphical user interface with respective one or more candidate graphical objects for insertion.

As described previously in reference to development module 132 shown in FIG. 1, development module 232 may similarly determine, using object prediction module 235, and based at least in part on development specifications 230 and on the indication of a selection of a region of a graphical user interface, a graphical object from the one or more candidate graphical objects. Development specifications 230 may associate the region of the graphical user interface with the one or more candidate graphical objects for insertion into the graphical user interface. Object prediction module 235 may communicate this determination to object management module 236, and object management module 236 may output, for display at the region of the graphical user interface, an indication of the graphical object.

In certain examples, such as illustrated in FIG. 1, responsive to object prediction module 235 identifying a candidate graphical object for insertion, object management module 236 may output, for display at the region of the graphical user interface, a preview of the graphical object as a suggested graphical object for insertion at the region of the graphical user interface. For instance, in FIG. 1, object management module 236 may output a preview of graphical object 107 (e.g., a representation of graphical object 107 using dashed lines) as a suggested object for insertion at a region of graphical user interface 100 that includes the current location of pointer 108. As described previously, a user may either confirm or reject this suggested object. If the user chooses to confirm insertion, object management module 236 may receive (e.g., via user interface module 234) an indication of a selection of this preview of graphical object 107. Responsive to receiving the indication of the selection of the preview of graphical object 107, object management module 236 outputs, for display at the region of graphical user interface 100 that includes the location of pointer 108, graphical object 107 (e.g., with solid rather than dashed lines).

In some examples, during the process of automatic object prediction, object prediction module 235 may determine one or more of a type (e.g., button, checkbox, text label) of a graphical object, a size of the graphical object, a particular insertion location of the graphical object, or an alignment of the graphical object relative to one or more other graphical objects in the graphical user interface (e.g., align left/center/right/top/middle/bottom relative to other objects). Object prediction module 235 may also adjust the spacing between objects based on predetermined or configurable space settings provided by development environment module 233.

In these examples, object management module 236 outputs, for display at the region of the graphical user interface, the indication of the graphical object based at least in part on the one or more of the type of the graphical object, the size of the graphical object, the insertion location of the graphical object, or the alignment of the graphical object with respect to the one or more other graphical objects in the graphical user interface. In the example of FIG. 1, object prediction module 235 may determine that graphical object 107 is a button having a size that matches the size of graphical object 106 and that is aligned with the middle of graphical object 106. Object prediction module 235 may determine the insertion location of graphical object 107 in a region that includes the current location of pointer 108, and may also determine an amount of spacing between graphical object 107 and graphical object 106. In some cases, the insertion location of graphical object 107 may comprise a center of graphical object 107, and may, in certain cases, align with the current location of pointer 108.

In some examples, object prediction module 235 may determine multiple different candidate graphical objects that are associated with a given region, such as the region that includes the location of pointer 108 shown in FIG. 1. In these examples, object management module 236 may output, for display in graphical user interface 100 (e.g., using user interface module 234), a group of options (not shown in FIG. 1), where each option represents a respective candidate graphical object of the different candidate graphical objects. (Examples of such options are illustrated in FIG. 4F.) Object management module 236 and/or user interface module 234 may receive an indication of a selection an option from this group of options, where the selected option represents the graphical object. For example, upon display of the options, an application developer may provide a selection of a particular graphical object that is desired for insertion at the region of the graphical user interface. Thus, in these examples, objection prediction module 235 is configured to identify a group of candidate graphical objects from which the application developer can choose for insertion. In some cases, objection prediction module 235 may sort this group of candidate graphical objects for display (e.g., based on confidence values associated with likeliness of selection), as described in further detail below.

As described above, object prediction module 235 is capable of determining one or more candidate graphical objects as predicted and/or suggested objects for insertion at a region of a graphical user interface, such as graphical user interface 100, based at least in part on a current position of a pointer, such as pointer 108. Object prediction module 235 may utilize development specifications 230 in making such determinations, where development specifications 230 may include guidelines or rules that associate one or more regions of graphical user interface 100 with the respective candidate graphical objects. In various examples, object prediction module 235 may use development specifications 230 to determine candidate graphical objects further based upon the existence of one or more other adjacent graphical objects that are located within a threshold distance of the region that includes pointer 108.

For example, referring to graphical user interface 100 shown in FIG. 1, object management module 236 may determine that graphical object 106 is located adjacent to the region of graphical user interface 100 that includes the location of pointer 108. In particular, object management module 236 may determine that this region is located within a threshold distance to the left of graphical object 106. In this example, using the guidelines or rules included in development specifications 230, object prediction module 235 may identify graphical object 107 as a candidate graphical object for insertion in graphical user interface 100, based not only on the location of pointer 108, but also on the existence of graphical object 106, which is located within this threshold distance of the region that includes the location of pointer 108. Furthermore, object prediction module 235 may determine one or more of an insertion location of graphical object 107, relative to adjacent graphical object 106, or an alignment of graphical object 107 relative to graphical object 106 (e.g., aligned at the middle of graphical objects 106 and 107).

Figure 3:
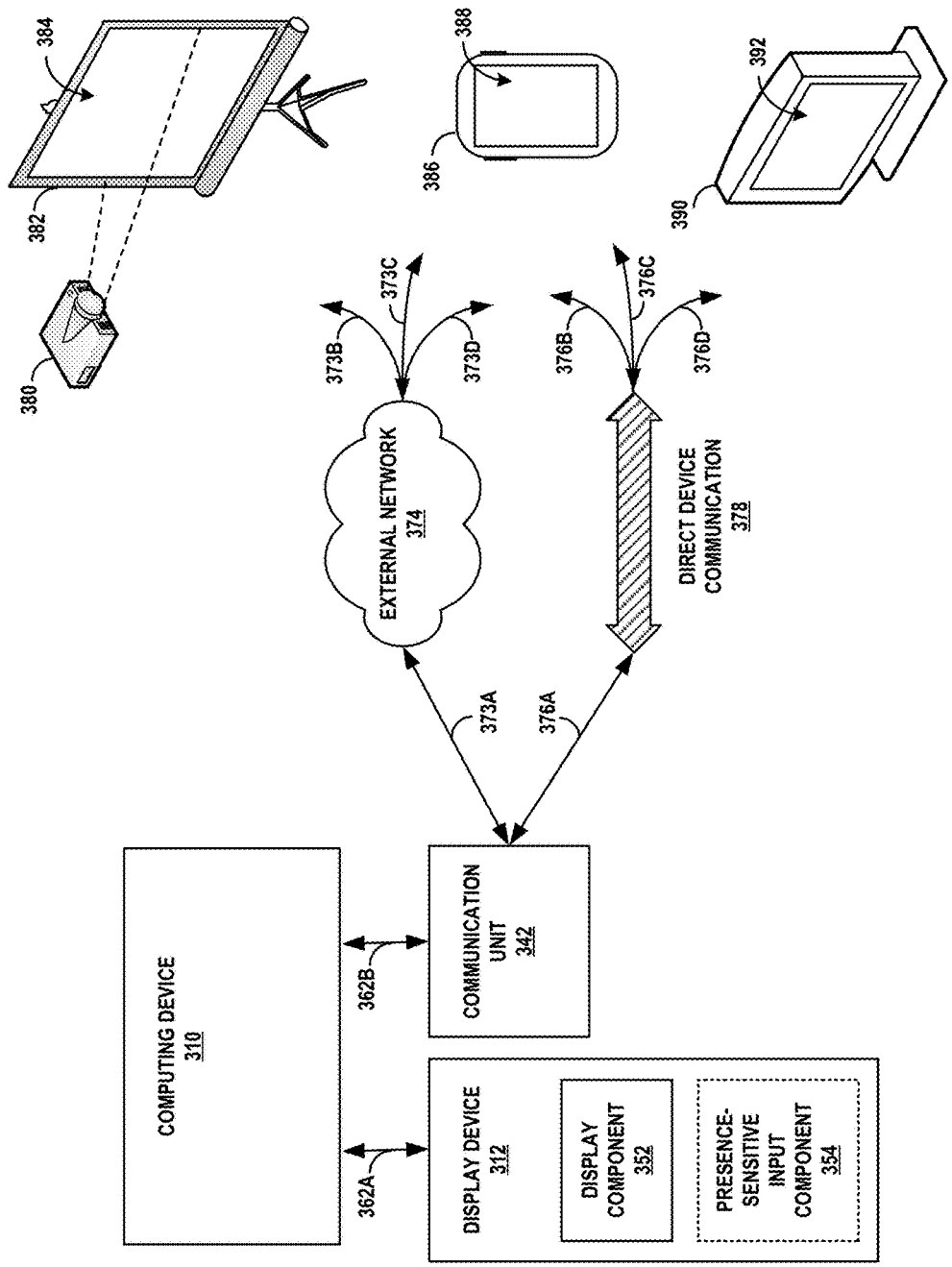
FIG. 3 is a block diagram illustrating an example computing device that outputs graphical content for display at a remote device, in accordance with one or more techniques of the present disclosure.

FIG. 3 is a block diagram illustrating an example computing device 310 that outputs graphical content for display at a remote device, in accordance with one or more techniques of the present disclosure. Graphical content, generally, may include any visual information that may be output for display, such as text, images, a group of moving images, to name only a few examples. The example shown in FIG. 3 includes computing device 310, a display device 312, communication unit 342, projector 380, projector screen 382, mobile device 386, and visual display component 390. In some examples, display device 312 may be a presence-sensitive display. Although shown for purposes of example in FIGS. 1 and 2 as a stand-alone computing device, a computing device such as computing device 310 may, generally, be any component or system that includes a processor or other suitable computing environment for executing software instructions and, for example, need not necessarily include a presence-sensitive display.

In some examples, computing device 310 may be a processor that includes functionality as described with respect to processors 240 in FIG. 2. In such examples, computing device 310 may be operatively coupled to display device 312 by a communication channel 362A, which may be a system bus or other suitable connection. Computing device 310 may also be operatively coupled to communication unit 342, further described below, by a communication channel 362B, which may also be a system bus or other suitable connection. Although shown separately as an example in FIG. 3, computing device 310 may be operatively coupled to display device 312 and communication unit 342 by any number of one or more communication channels.

In other examples, such as illustrated previously by computing device 110 in FIG. 1 and computing device 210 in FIG. 2, computing device 310 may refer to a portable or mobile device such as mobile phones (including smart phones), laptop computers, and the like. In some examples, computing device 310 may be a desktop computer, tablet computer, smart television platform, camera, a PDA, server, or mainframe.

Display device 312 may include display component 352 and, in cases in which display device 312 comprises a presence-sensitive display, presence-sensitive input component 354. Display component 352 may, for example, receive data from computing device 310 and display the graphical content. In some examples, presence-sensitive input component 354 may determine one or more user inputs (e.g., continuous gestures, multi-touch gestures, single-touch gestures) at display device 312 using capacitive, inductive, and/or optical recognition techniques and send indications of such user input to computing device 310 using communication channel 362A. In some examples, presence-sensitive input component 354 may be physically positioned on top of display component 352 such that, when a user positions an input unit over a graphical element displayed by display component 352, the location at which presence-sensitive input component 354 corresponds to the location of display component 352 at which the graphical element is displayed.

As shown in FIG. 3, computing device 310 may also include and/or be operatively coupled with communication unit 342. Communication unit 342 may include functionality of one or more of communication units 242 as described in FIG. 2. Examples of communication unit 342 may include a network interface card, an Ethernet card, an optical transceiver, a radio frequency transceiver, or any other type of device that can send and receive information. Other examples of such communication units may include Bluetooth, 3G, and WiFi radios, and Universal Serial Bus (USB) interfaces. Computing device 310 may also include and/or be operatively coupled with one or more other devices (e.g., input devices, output components, memory, storage devices) that are not shown in FIG. 3 for purposes of brevity and illustration.

FIG. 3 also illustrates a projector 380 and projector screen 382. Other such examples of projection devices may include electronic whiteboards, holographic display components, and any other suitable devices for displaying graphical content. Projector 380 and projector screen 382 may include one or more communication units that enable the respective devices to communicate with computing device 310. In some examples, the one or more communication units may enable communication between projector 380 and projector screen 382. Projector 380 may receive data from computing device 310 that includes graphical content. Projector 380, in response to receiving the data, may project the graphical content onto projector screen 382. In some examples, projector 380 may determine one or more user inputs (e.g., continuous gestures, multi-touch gestures, single-touch gestures) at projector screen using optical recognition or other suitable techniques and send indications of such user input using one or more communication units to computing device 310. In some examples, projector screen 382 may be unnecessary, and projector 380 may project graphical content on any suitable medium and detect one or more user inputs using optical recognition or other such suitable techniques.

Projector screen 382, in some examples, may include a presence-sensitive display 384. Presence-sensitive display 384 may include a subset of functionality or all of the functionality of display device 112 (FIG. 1), display device 212 (FIG. 2), and/or display device 312 as described in this disclosure. In some examples, presence-sensitive display 384 may include additional functionality. Projector screen 382 (e.g., an electronic whiteboard), may receive data from computing device 310 and display the graphical content. In some examples, presence-sensitive display 384 may determine one or more user inputs (e.g., continuous gestures, multi-touch gestures, single-touch gestures) at projector screen 382 using capacitive, inductive, and/or optical recognition techniques and send indications of such user input using one or more communication units to computing device 310.

FIG. 3 also illustrates mobile device 386 and visual display component 390. Mobile device 386 and visual display component 390 may each include computing and connectivity capabilities. Examples of mobile device 386 may include e-reader devices, convertible notebook devices, hybrid slate devices, and the like. Examples of visual display component 390 may include other devices such as televisions and computer monitors. In some examples, visual display component 390 may be a vehicle cockpit display or navigation display (e.g., in an automobile, aircraft, or some other vehicle). In some examples, visual display component 390 may be a home automation display or some other type of display that is separate from computing device 310.

As shown in FIG. 3, mobile device 386 may include a presence-sensitive display 388. Visual display component 390 may include a presence-sensitive display 392. Presence-sensitive displays 388, 392 may include a subset of functionality or all of the functionality of a presence-sensitive display as described in this disclosure. In some examples, presence-sensitive displays 388, 392 may include additional functionality. In any case, presence-sensitive display 392, for example, may receive data from computing device 310 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to computing device 310.

As described above, in some examples, computing device 310 may output graphical content for display at display device 312 that is coupled to computing device 310 by a system bus or other suitable communication channel. Computing device 310 may also output graphical content for display at one or more remote devices, such as projector 380, projector screen 382, mobile device 386, and visual display component 390. For instance, computing device 310 may execute one or more instructions to generate and/or modify graphical content in accordance with techniques of the present disclosure. Computing device 310 may output the data that includes the graphical content to a communication unit of computing device 310, such as communication unit 342. Communication unit 342 may send the data to one or more of the remote devices, such as projector 380, projector screen 382, mobile device 386, and/or visual display component 390. In this way, computing device 310 may output the graphical content for display at one or more of the remote devices. In some examples, one or more of the remote devices may output the graphical content at a presence-sensitive display that is included in and/or operatively coupled to the respective remote devices.

In some examples, computing device 310 may not output graphical content at display device 312 that is operatively coupled to computing device 310. In other examples, computing device 310 may output graphical content for display at both a display 312 that is coupled to computing device 310 by communication channel 362A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 310 and output for display at display device 312 may be different than graphical content display output for display at one or more remote devices.

Computing device 310 may send and receive data using any suitable communication techniques. For example, computing device 310 may be operatively coupled to external network 374 using network link 373A. Each of the remote devices illustrated in FIG. 3 may be operatively coupled to network external network 374 by one of respective network links 373B, 373C, or 373D. External network 374 may include network hubs, network switches, network routers, etc., that are operatively inter-coupled thereby providing for the exchange of information between computing device 310 and the remote devices illustrated in FIG. 3. In some examples, network links 373A-373D may be Ethernet, asynchronous transfer mode (ATM) or other network connections. Such connections may be wireless and/or wired connections.

In some examples, computing device 310 may be operatively coupled to one or more of the remote devices included in FIG. 3 using direct device communication 378. Direct device communication 378 may include communications through which computing device 310 sends and receives data directly with a remote device, using wired or wireless communication. That is, in some examples of direct device communication 378, data sent by computing device 310 may not be forwarded by one or more additional devices before being received at the remote device, and vice-versa. Examples of direct device communication 378 may include Bluetooth, Near-Field Communication, Universal Serial Bus, Wi-Fi, and infrared. One or more of the remote devices illustrated in FIG. 3 may be operatively coupled with computing device 310 by communication links 376A-376D. In some examples, communication links 376A-376D may be connections using Bluetooth, Near-Field Communication, Universal Serial Bus, Wi-Fi, or infrared. Such connections may be wireless and/or wired connections.

In accordance with techniques of the disclosure, computing device 310 may be operatively coupled to visual display component 390 using external network 374. Computing device 310 may output a graphical user interface (e.g., graphical user interface 100 shown in FIG. 1) in a graphical development environment for display at visual display component 390. For instance, computing device 310 may send data that includes a representation of the graphical user interface to communication unit 342. Communication unit 342 may send the data that includes the representation of the graphical user interface to visual display component 390 using external network 374. Visual display component 390, in response to receiving the data using external network 374, may cause presence-sensitive display 392 to output the graphical user interface. In response to receiving a user input at presence-sensitive display 392, visual display component 390 may send an indication of the user input to computing device 310 using external network 374. Communication unit 342 of may receive the indication of the user input, and send the indication to computing device 310.

In various examples, computing device 310 may perform functions similar to those performed by processors 240 shown in FIG. 2. For instance, computing device 310 may execute or otherwise be configured to implement one or more of development modules 232, user interface module 234, and/or application modules 238. As one example, computing device 310 may be configured to output, for display (e.g., at display device 312, visual display component 390, presence-sensitive display 384, presence-sensitive display 388), in a graphical development environment that is used during development of a software application (e.g., one of application modules 238), a graphical user interface (e.g., graphical user interface 100) that is associated with the software application. Computing device 310 may receive a development specification (e.g., one of development specifications 230) for use with the graphical development environment, wherein the development specification associates a region of the graphical user interface with one or more candidate graphical objects for insertion into the graphical user interface.

Computing device 310 may receive an indication of a selection of the region of the graphical user interface, and may determine, based at least in part on the development specification and on the indication of the selection of the region of the graphical user interface, a graphical object (e.g., graphical object 107) from the one or more candidate graphical objects. Computing device 310 may then output, for display at the region of the graphical user interface, an indication of the graphical object.

FIGS. 4A-4G are screen diagrams illustrating examples of a graphical user interface 400 output for display by an example computing device that is configured to insert one or more graphical objects into a graphical user interface, in accordance with one or more aspects of the present disclosure. However, many other examples of graphical user interfaces may be displayed in other instances. Any of computing devices 110 (FIG. 1), 210 (FIG. 2), and 310 (FIG. 3) may be configured to output the example graphical user interface 400. For purposes of illustration only, FIGS. 4A-4G are described below in the context of computing device 210.

Figure 4A:
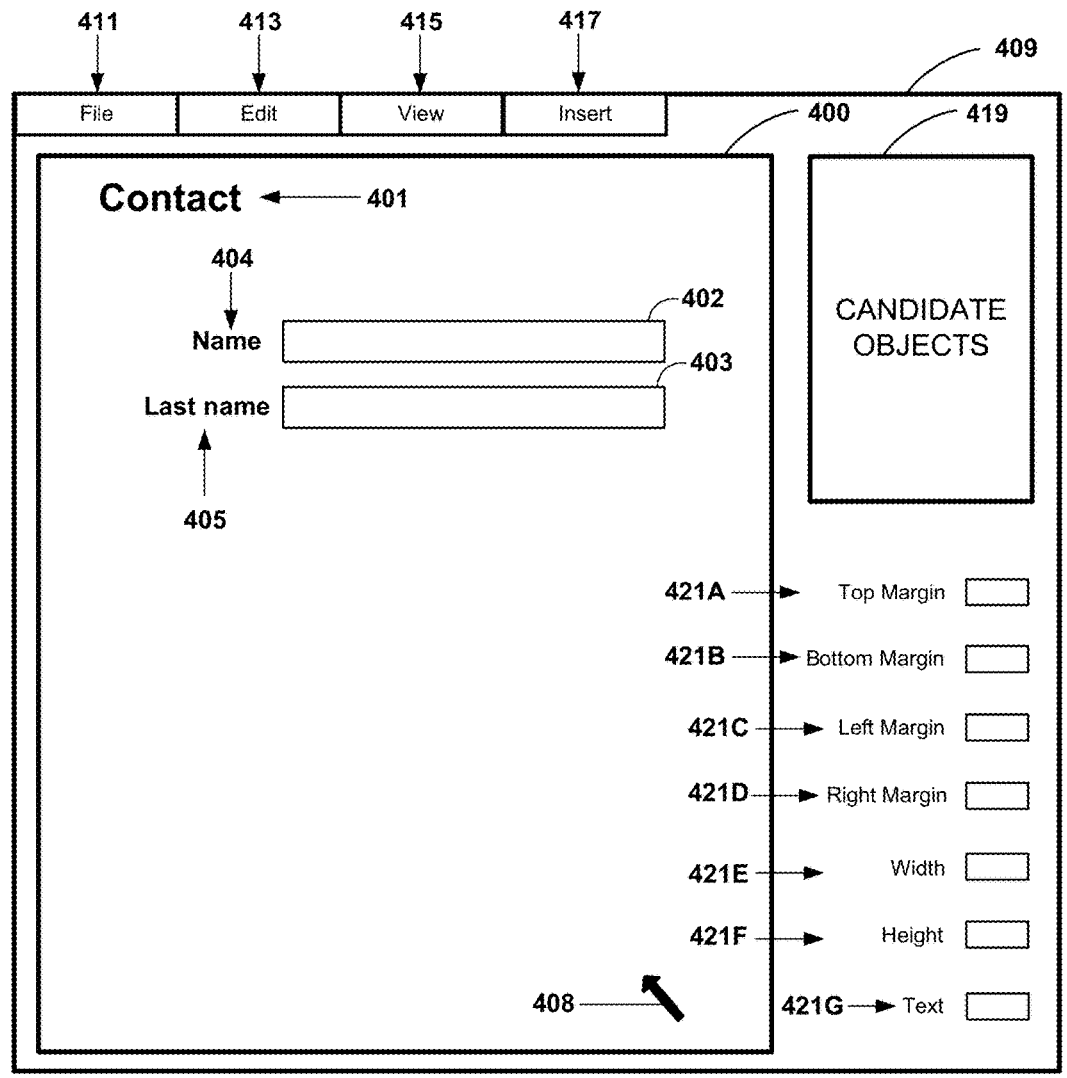
FIGS. 4A-4G are screen diagrams illustrating examples of a graphical user interface output for display by an example computing device that is configured to insert one or more graphical objects into the graphical user interface, in accordance with one or more aspects of the present disclosure.

FIG. 4A is a screen diagram illustrating an example graphical development environment 409 that may be used during development of a software application. For example, development environment module 233 may output (e.g., using user interface module 234) graphical development environment 409 during development of one of application modules 238, such as a contact manager application. Graphical development environment 409 includes graphical user interface 400, which may comprise one example of graphical user interface 100 shown in FIG. 1.

Graphical development environment 409 may also include multiple different menus 411, 413, 415, and 417 that each include one or more selectable options. For example, an application developer interacting with graphical development environment 409 may select or use menu 411 to view selectable options that are associated with one or more file operations, menu 413 to view selectable options that are associated with one or more graphical object editing operations, menu 415 to view selectable options that are associated with one or more graphical object viewing operations, and menu 417 to view selectable options that are associated with one or more graphical object insertion operations.

Graphical development environment 409 also includes candidate graphical objects 419 and input fields 421A-421G (collectively, "input fields 421," which may comprise one or more text-entry fields). Candidate graphical objects 419 may comprise a group or palette of one or more selectable candidate objects that may be inserted into graphical user interface 400. Non-limiting examples of candidate graphical objects 419 graphical button, a graphical checkbox, a label, an input field, and a date selector. The application developer may select one or more of candidate graphical objects 419 and insert these selected objects into graphical user interface 400 (e.g., by using a drag gesture to drag the selected objects into one or more desired locations within graphical user interface 400). The application developer may also use menu 417 to insert graphical objects. In one or more examples, as described above, object prediction module 235 and/or object management module 236 are also configured to automatically determine and insert one or more graphical objects into graphical user interface 400, as further described below with respect to FIGS. 4B-4G.

After one or more graphical objects are inserted into graphical user interface 400, the application developer may perform one or more edit operations on these graphical objects, such as by using menu 413 or by directly manipulating the objects within graphical user interface 400. For example, the application developer may move, rotate, resize, or perform another type of edit operation. The application developer may also use one or more of input fields 421 to edit one or more properties of the graphical objects. For example, the application developer may select a particular graphical object and enter or change the width or height of the graphical object using input fields 421E or 421F. The application developer may also enter or change the text associated with the graphical object using input field 421G. Furthermore, the application developer may use menu 415 to change one or more views of these objects within graphical user interface 400.

In addition, the application developer may utilize one or more of input fields 421, which may be provided by development environment module 233, to adjust the margins of graphical development environment 409 and/or graphical user interface 400. As shown in the example of FIG. 4A, input field 421A is associated with a top margin of graphical user interface 400, input field 421B is associated with a bottom margin of graphical user interface 400, input field 421C is associated with a left margin of graphical user interface 400, and input field 421D is associated with a right margin of graphical user interface 400. In some examples, development modules 232 (e.g., one or more of development environment module 233, object prediction module 235, or object management module 236) may be configured to automatically populate or modify the values included in one or more of input fields 421 (including input fields 421E, 421F, and 421G associated with attributes of graphical objects that may have already been inserted into graphical user interface 400).

In graphical user interface 400, graphical object 401 is a label associated with the form provided by graphical user interface 400. In this case, the name or text associated with graphical object 401 is "Contact," given that the application associated with graphical user interface 400 is a contact manager application. Graphical object 402 is a text input field associated with graphical object 404, and graphical object 404 is a label having the text "Name," which corresponds to a first name of a contact. Graphical object 403 is a text input field associated with graphical object 405, and graphical object 405 is a label having the text "Last name," which corresponds to a last name of the contact.

While interacting with graphical user interface 400, the application developer may move pointer 408 (e.g., a cursor) to one or more locations within graphical interface 400. As shown in FIG. 4A, pointer 408 is at a bottom-right region of graphical user interface 400. As will be described below, based on one or more factors, development modules 132 may be configured to automatically determine, or predict, that the application developer may want to insert one or more new graphical objects at certain regions of graphical user interface 400.

Figure 4B:
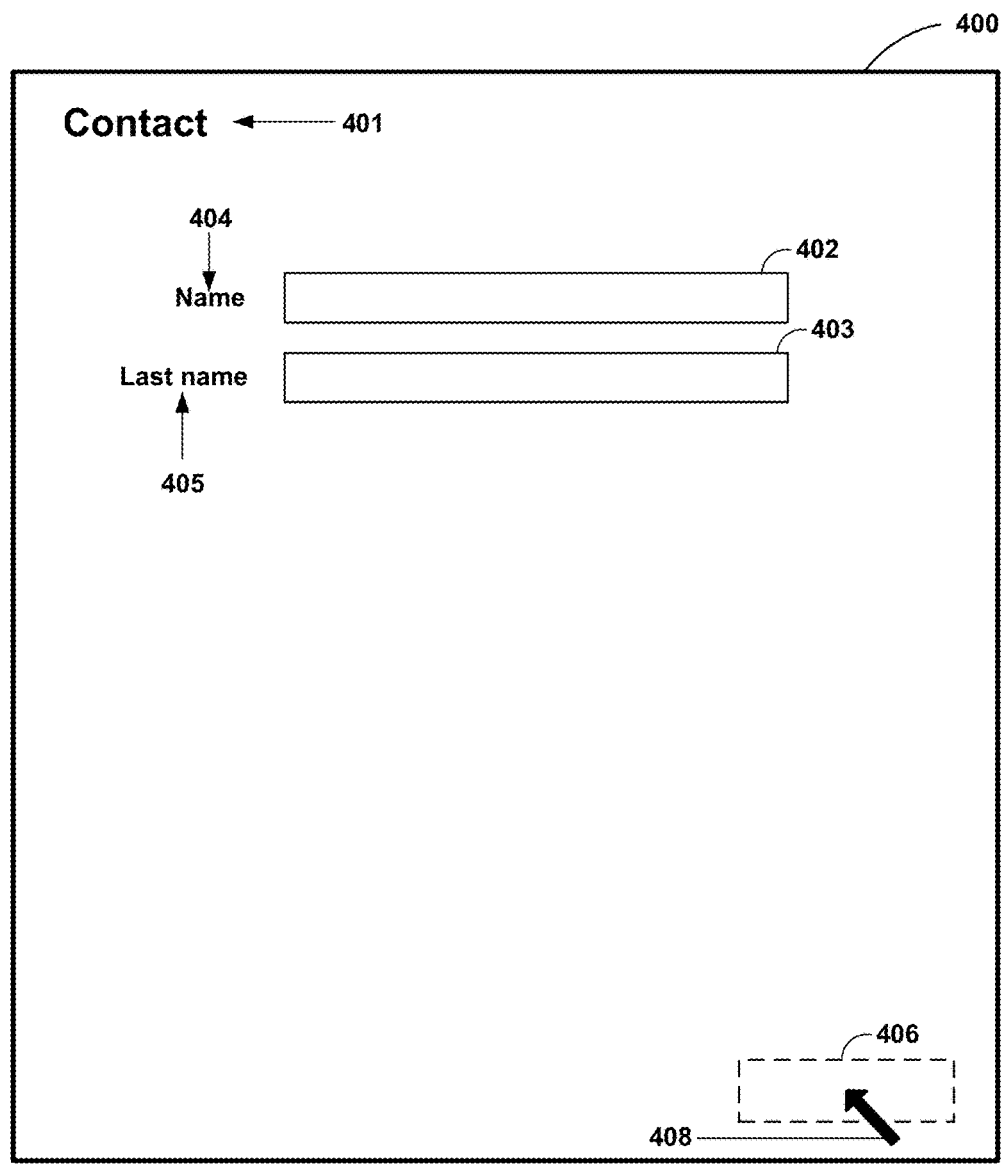

FIG. 4B is a screen diagram illustrating additional example details of graphical user interface 400. For purposes only of further illustrating example details of graphical user interface 400, graphical development environment 409 is not shown in FIGS. 4B-4G.

In the example shown in FIG. 4B, relative to the example of FIG. 4A, the application developer may continue the process of attempting to insert additional graphical objects within graphical user interface 400. The application developer may move pointer 408 within graphical user interface 400, such as by using an input component (e.g., one of input components 244 or presence-sensitive input component 254 shown in FIG. 2). In FIG. 4B, the application developer has moved pointer 408 to a location at a bottom-right corner region of graphical user interface 400.

Based upon the current location of pointer 408, object prediction module 235 may determine that graphical object 406 (e.g., a button) may be inserted at the region indicated in FIG. 4B, which is a region that encompasses or otherwise includes the location of pointer 408. Object management module 236 and/or user interface module 234 may output an indication of graphical object 406. For example, object management module 236 and/or user interface module 234 may output a preview of graphical object 406 uses dashed lines to indicate that graphical object 406 is a predicted or suggested object for insertion at the indicated region of graphical user interface 400. Upon receiving a further user input from the application developer to confirm insertion (e.g., a keypress, a mouse button click, a menu selection, a button activation, a tactile activation, an audible activation, another gesture or non-gesture input), object management module 236 and/or user interface module 234 may commit the insertion of graphical object 406 within graphical user interface 400 by changing the dashed lines around the perimeter of graphical object 406 to a solid line. If, however, the application developer rejects the suggested insertion of graphical object 406, graphical object 406 is not be inserted within graphical user interface 400.

In determining to suggest insertion of graphical object 406, object prediction module 235 may, as described previously, utilize one or more guidelines or rules in development specifications 230. Development specifications 230 may associate a region that includes the location of pointer 408 with graphical object 406. If the application developer has moved pointer 408 into this region, development specifications 230 may indicate that graphical object 406 is a candidate object for insertion at this region.

Figure 4C:
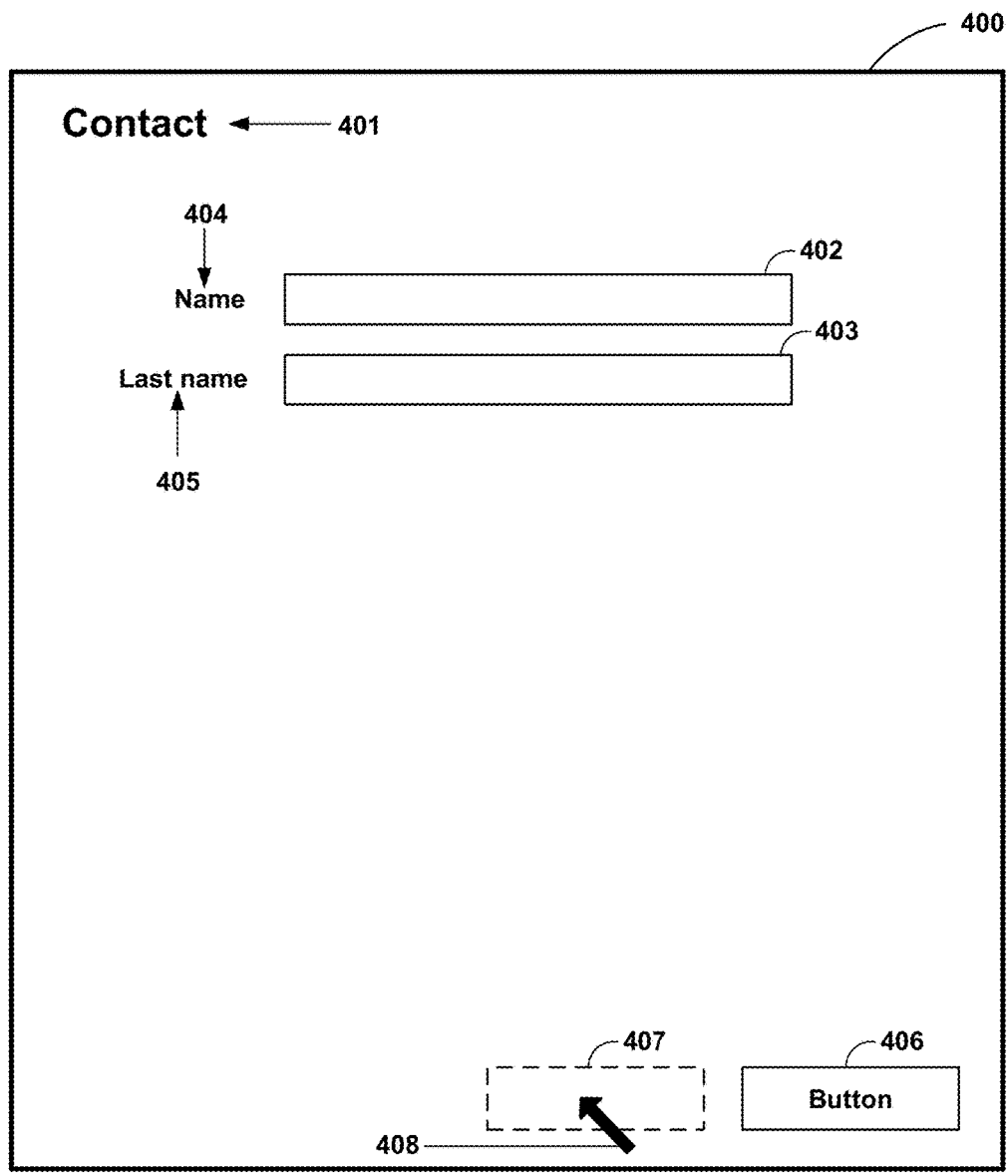

Continuing with this example, FIG. 4C is a screen diagram illustrating additional example details of graphical user interface 400. As shown in FIG. 4C, the application developer has confirmed insertion of graphical object 406 (which, in this example, is a button), and has moved pointer 408 to a new location, as shown in FIG. 4C, which is located in a region to the left of graphical object 406. Using development specifications 230, object prediction module 235 determines that graphical object 407 may be inserted at this region of graphical user interface 400 that includes the new, current location of pointer 408. Object management module and/or user interface module 234 may output a preview of graphical object 407 in dashed lines to indicate that graphical object 407 is a suggested object for insertion. Upon receiving a user input from the application developer to confirm insertion, the dashed lines around graphical object 407 may be replaced with a solid line. In some examples, graphical objects 406 and 407 may comprise a button pair (e.g., "OK" and "CANCEL" buttons).

In predicting insertion of graphical object 407, object prediction module 235 may also use development specifications 230 to make such a prediction further based on the existence and location of any nearby, adjacent graphical objects. For instance, object prediction module 235 may determine graphical object 407 as a suggested, predicted object for insertion based not only on the current location of pointer 408, but also, in some examples, based further on the location of graphical object 406, which, in this example, was previously inserted into graphical user interface 400.

Object management module 236 and/or object prediction module 235 may, for example, determine that graphical object 406 is adjacent to a region that includes the current location of pointer 408 shown in FIG. 4C. The location of graphical object 406 may be, or be based on, the center of graphical object 406 as positioned within graphical user interface 400. Using this location of graphical object 406, object management module 236 and/or object prediction module 235 may determine that graphical object 406 is adjacent to pointer 408 because it is located within a threshold distance of a region of graphical user interface 400 that includes pointer 408. The size of this region may be determined by development modules 232 and/or development specifications 230, or may be further specified by the application developer, in some cases.

Upon determining or receiving an indication that graphical object 406 is adjacent to pointer 408, object prediction module 235 may determine that graphical object 407 is a candidate object for insertion. Object prediction module 235 may, in various examples, further determine one or more of a type of graphical object 407 (e.g., label, radio button, button, input field, checkbox, date selector), a size of graphical object 407, an insertion location of graphical object 407, or an alignment of graphical object 407 relative to one or more other graphical objects in graphical user interface 400. For example, object prediction module 235 may determine that graphical object 407 is a button object in response to determining that the region that includes the location of pointer 408 is located adjacent to, and to the left of, graphical object 406, where graphical object 406 also is a button. Object prediction module 235 may determine the size of graphical object 407 based on its type or one or more other factors (e.g., based on the size of graphical button 406). In FIG. 4C, objection prediction module 235 has determined that graphical object 407 is a button have the same size as graphical object 406.

The insertion location of graphical object 407 may be based on the determined region of graphical user interface 400 that includes the current location of pointer 408. In some cases, the insertion location may be the center of graphical object 407, which may also correspond to the current location of pointer 408, in some instances. Object prediction module 235 may further determine an alignment of graphical object 407, particularly with respect to other objects in graphical user interface, such as graphical object 406. As one example, object prediction module 235 may align graphical objects 406 and 407 along a mid-line axis, and may, in some cases, space apart graphical objects 406 and 407 by a determined or threshold amount of spacing.

Figure 4D:
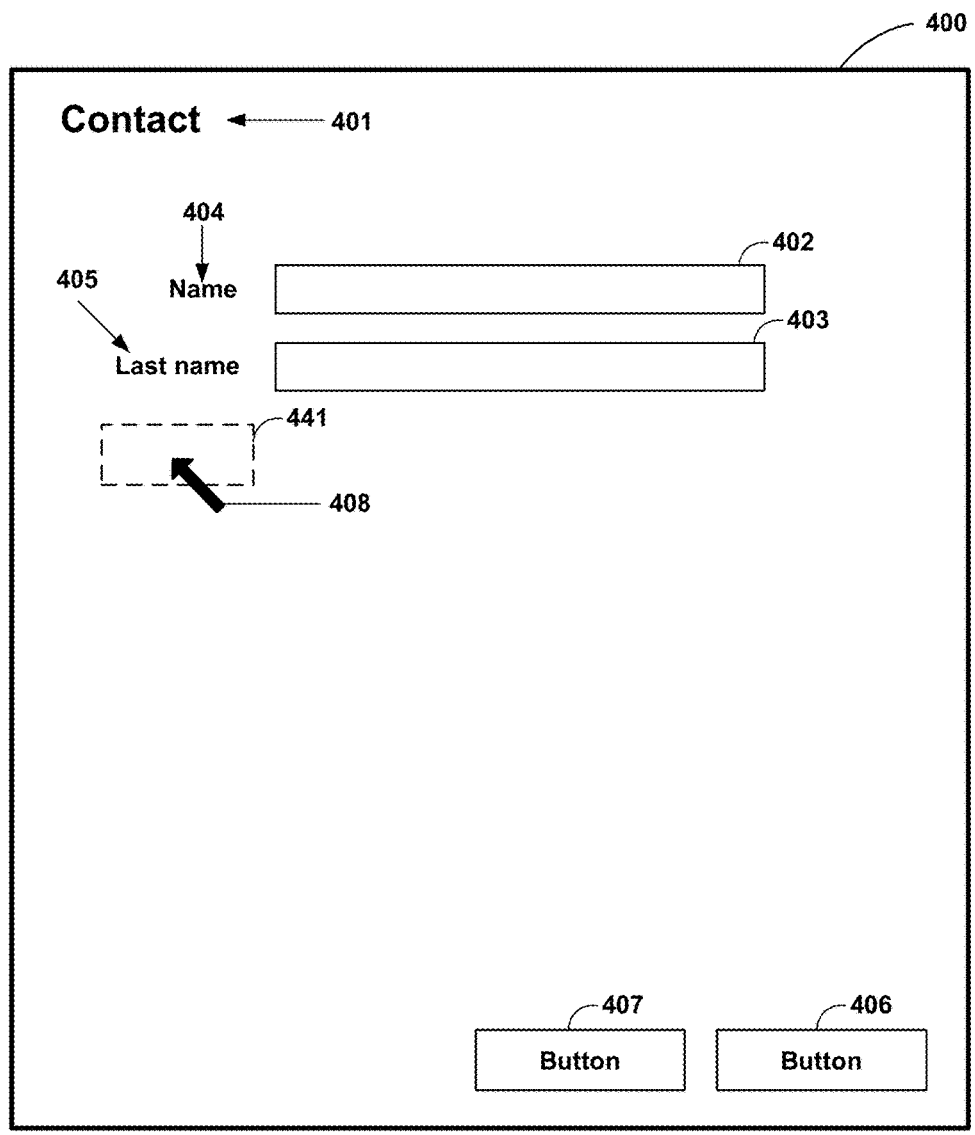

Continuing with the example shown in FIG. 4C, FIG. 4D is a screen diagram illustrating additional example details of graphical user interface 400. Graphical objects 406 and 407 are both shown in FIG. 4D as buttons, and it is assumed that the application developer has confirmed the suggested insertion of graphical object 407, as shown in FIG. 4C, at the indicated region of graphical user interface 400, which is located to the left of graphical object 406. As a result, graphical object 407 is shown with a solid line rather than dashed lines.

As shown in FIG. 4D, the application developer has moved pointer 408 to a different location in graphical user interface 400. In particular, pointer 408 is located in a region that is adjacent to, and below, graphical object 405, which is a text label object ("Last name"). Based at least on the location of pointer 408, object prediction module 235 uses development specifications 230 to determine that graphical object 441 may be inserted at the region of graphical user interface 400 that includes the current location of pointer 408 and that is below graphical object 405. Initially, object management module 236 and/or user interface module 234 may output a preview of graphical object 441 at the indicated region, using dashed lines, to indicate that graphical object 441 is a suggested object for insertion at this region.

Upon receiving a confirmation or other selection associated with the suggestion, object management module 236 and/or user interface module 234 may change the dashed lines to a solid line around the perimeter of graphical object 441, indicating its insertion into graphical user interface 400.

In some examples, objection prediction module 235 may use development specifications 230 to predict insertion of graphical object 441 based further on the existence and location of graphical object 405 with respect to pointer 408. As noted above, pointer 408 is located in a region of graphical user interface 400 that is adjacent to, and below, graphical object 405. Based on the location of graphical object 405 within a threshold distance of the region that includes pointer 408, object prediction module 235 may determine, using development specifications 230, to suggest insertion of graphical object 441 as a candidate object at this region. Furthermore, based on the type of graphical object 405 (e.g., label), object prediction module 235 may further determine that the type of suggested graphical object 441 is also a label, in order to create a form-like interface in this particular example. Thus, in some examples, development specifications 230 may identify graphical object 441 as a candidate object for insertion based on the location of pointer 408 and/or the location of graphical object 405 relative to the region of graphical user interface 400 that includes the location of pointer 408.

Figure 4E:
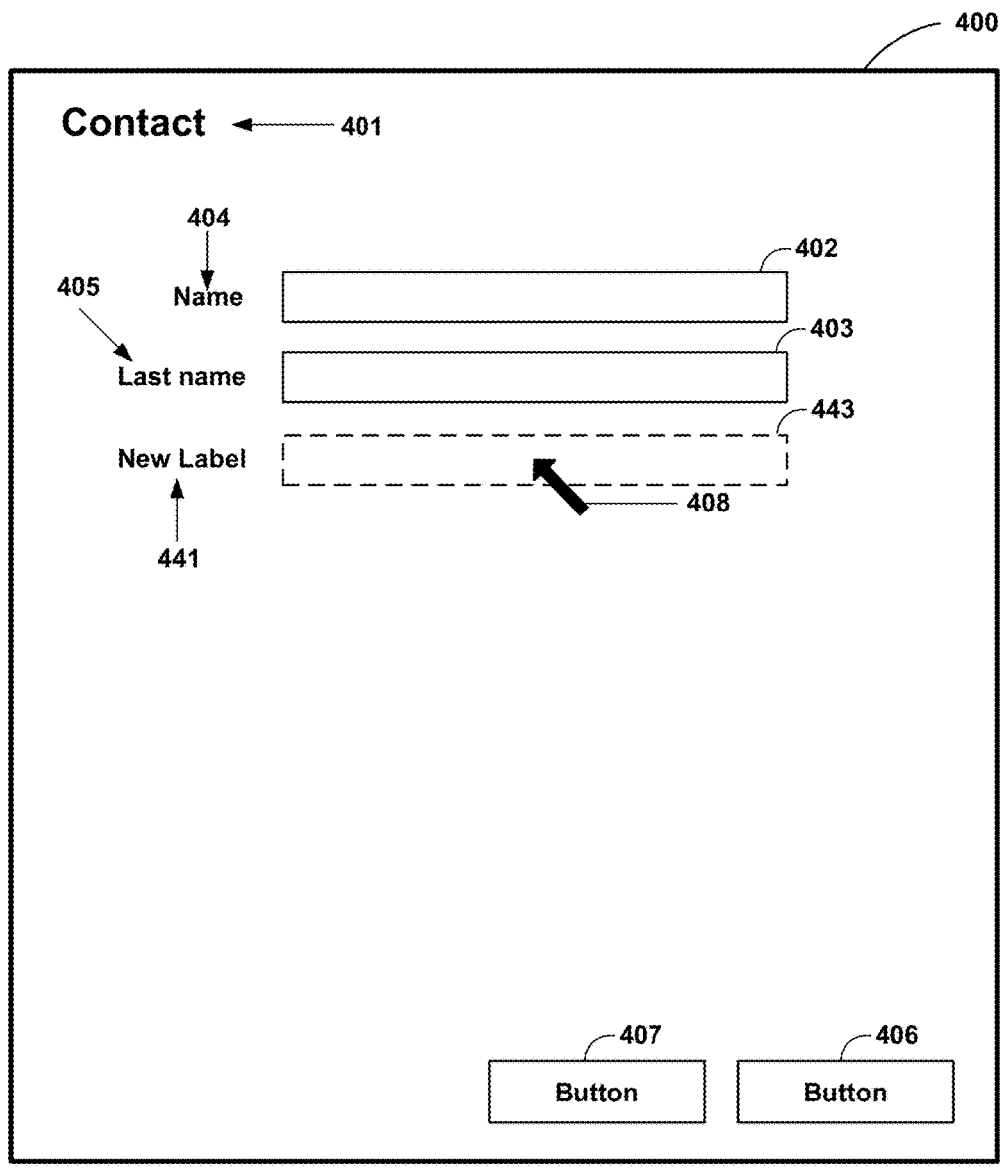
Figure 4F:
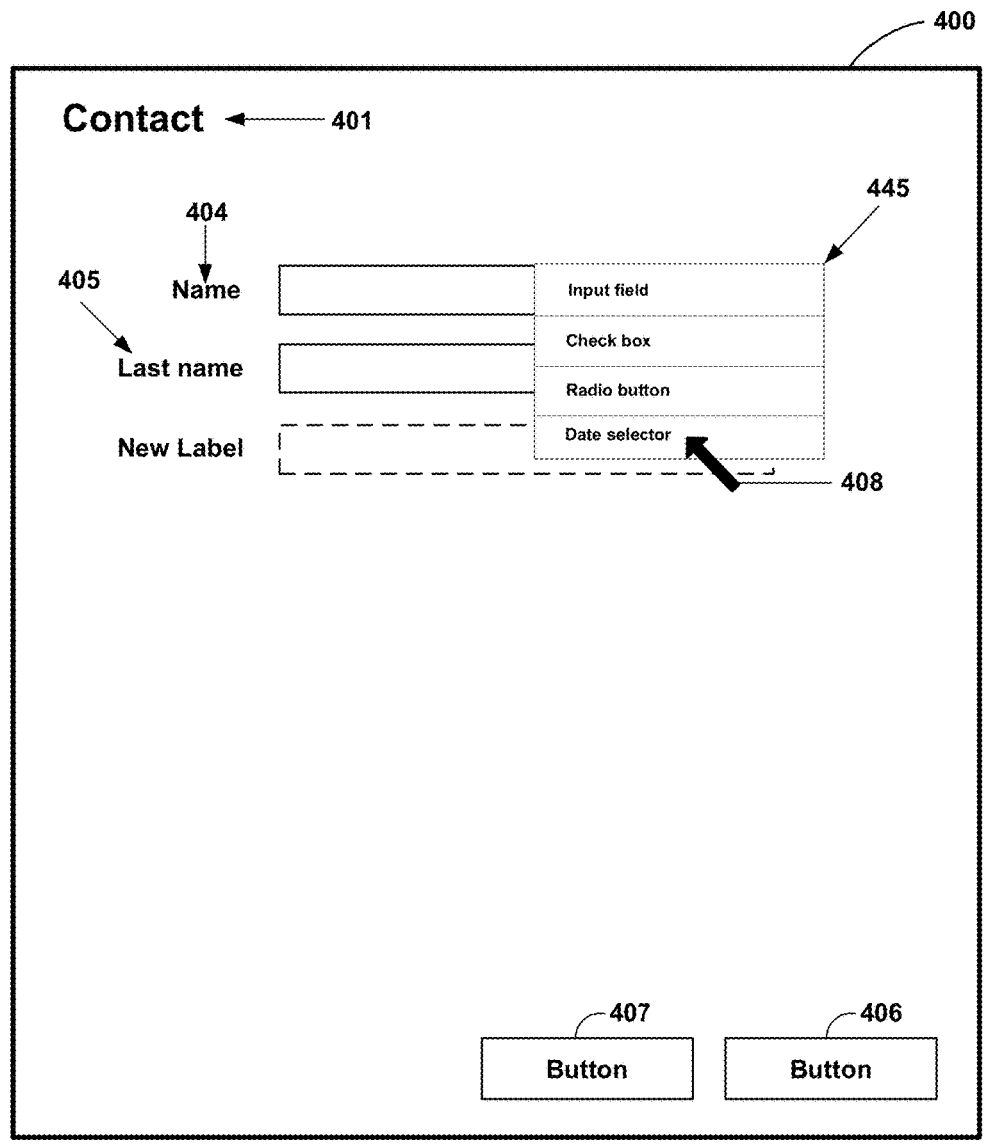

Continuing with the example shown in FIG. 4D, FIG. 4E is a screen diagram illustrating additional example details of graphical user interface 400. As shown in FIG. 4E, graphical object 441 has been inserted into graphical user interface 400 as a text label named "New Label" (e.g., upon receiving confirmation of insertion by the application developer). The application developer has further moved pointer 408 to a new location in graphical user interface 400, as shown in FIG. 4E. Based at least on the location of pointer 408, object prediction module 235 uses development specifications 230 to determine that graphical object 443 may be inserted at the region of graphical user interface 400 that includes the current location of pointer 408 and that is below graphical object 403. Initially, object management module 236 and/or user interface module 234 may output a preview of graphical object 443 at the indicated region, using dashed lines, to indicate that graphical object 443 is a suggested object for insertion at this region. Upon receiving a confirmation or other selection associated with the suggestion, object management module 236 and/or user interface module 234 may change the dashed lines to a solid line around the perimeter of graphical object 443, indicating its insertion into graphical user interface 400.

In some examples, objection prediction module 235 may use development specifications 230 to predict insertion of graphical object 443 based further on the existence and location of graphical object 403 with respect to pointer 408. In FIG. 4E, pointer 408 is located in a region of graphical user interface 400 that is adjacent to, and below, graphical object 403, where graphical object 403 is a text input field. Based on the location of graphical object 403 within a threshold distance of the region that includes pointer 408, object prediction module 235 may determine, using development specifications 230, to suggest insertion of graphical object 443 as a candidate object at this region. Furthermore, based on the alignment, location, and/or size of graphical object 403, object prediction module 235 may also determine the alignment, insertion location, and/or size of graphical object 443 relative to graphical object 403. For instance, object prediction module 235 may determine that the size of graphical object 443 will match the size of graphical object 403, and also that graphical object 443 will be spaced a selected distance below, and center aligned with, graphical object 403.

In addition, based on the type of graphical object 403 (e.g., text input field), object prediction module 235 may further determine the type of suggested graphical object 441. However, in various cases, based on the location of pointer 408 and/or the location of graphical object 403 relative to this location, object prediction module 235 may determine multiple different possible candidate objects for insertion at the region that includes the location of pointer 408. For instance, development specifications 230 may associate the region that includes pointer 408 with these multiple different candidate graphical objects. In these cases, such as shown in FIG. 4F, object prediction module 235 may identify a group of candidate graphical objects for insertion, and object management module 236 and/or user interface module 234 may output a group of selectable options associated with these candidates.

FIG. 4F is a screen diagram illustrating additional example details of graphical user interface 400. As shown, object management module 236 and/or user interface module 234 may output a menu 445, which includes a group of selectable options. Each option may represent a respective candidate graphical object of the multiple different candidate graphical objects determined by object prediction module 235. In the example of FIG. 4F, for example, object prediction module 235 may, using development specifications 230, have identified four different candidate graphical objects for possible insertion at the region of pointer 408: a text input field, a checkbox, a radio button, and a date selector. Each option in menu 445 may include a representation (e.g., textual representation) of one of these candidate objects, as shown in FIG. 4F.

Upon output of menu 445 in graphical user interface 400, the application developer may select one of the options in menu 445 to identify a corresponding candidate graphical object for insertion. In the example of FIG. 4F, the application developer selects the option of "Date selector" in menu 445 to request insertion of graphical object 443 as a date selector.

In some examples, object prediction module 235 may sort the options included in menu 445 based on one or more confidence values. For example, using development specifications 230, object prediction module 235 may identify the following candidate objects for possible insertion at the region that includes pointer 408 shown in FIG. 4F: a text input field, a checkbox, a radio button, and a date selector. However, based on one or more factors, object prediction module 235 may predict that it is more likely that an application developer may wish to insert certain one or more of these candidate objects than others. For example, based on the location of pointer 408 and/or the location of adjacent graphical object 403, object prediction module 235 may predict that the application developer may be likely to insert a graphical object at the region that includes pointer 408 in the following order of likelihood (highest to lowest): (a) text input field; (b) checkbox; (c) radio button; and (d) date selector.

As a result, in these examples, object prediction module 235 may determine confidence values that are each associated with a respective one of these candidate graphical objects. These confidence values may, in some examples, be numbers or other relative indicators. Object prediction module 235 may sort the options included in menu 445 based on these confidence values to create a sorted order of options. As shown in FIG. 4F, object management module 236 and/or user interface module 234 may output these options of menu 445 in the sorted order. In this example, because a text input field candidate object has the highest confidence value, the option named "Input field" may appear at the top of the list of sorted options in menu 445. Given that the date selector candidate object has the lowest confidence value, the option named "Date selector" may appear at the bottom of the list of sorted options in menu 445.

Figure 4G:
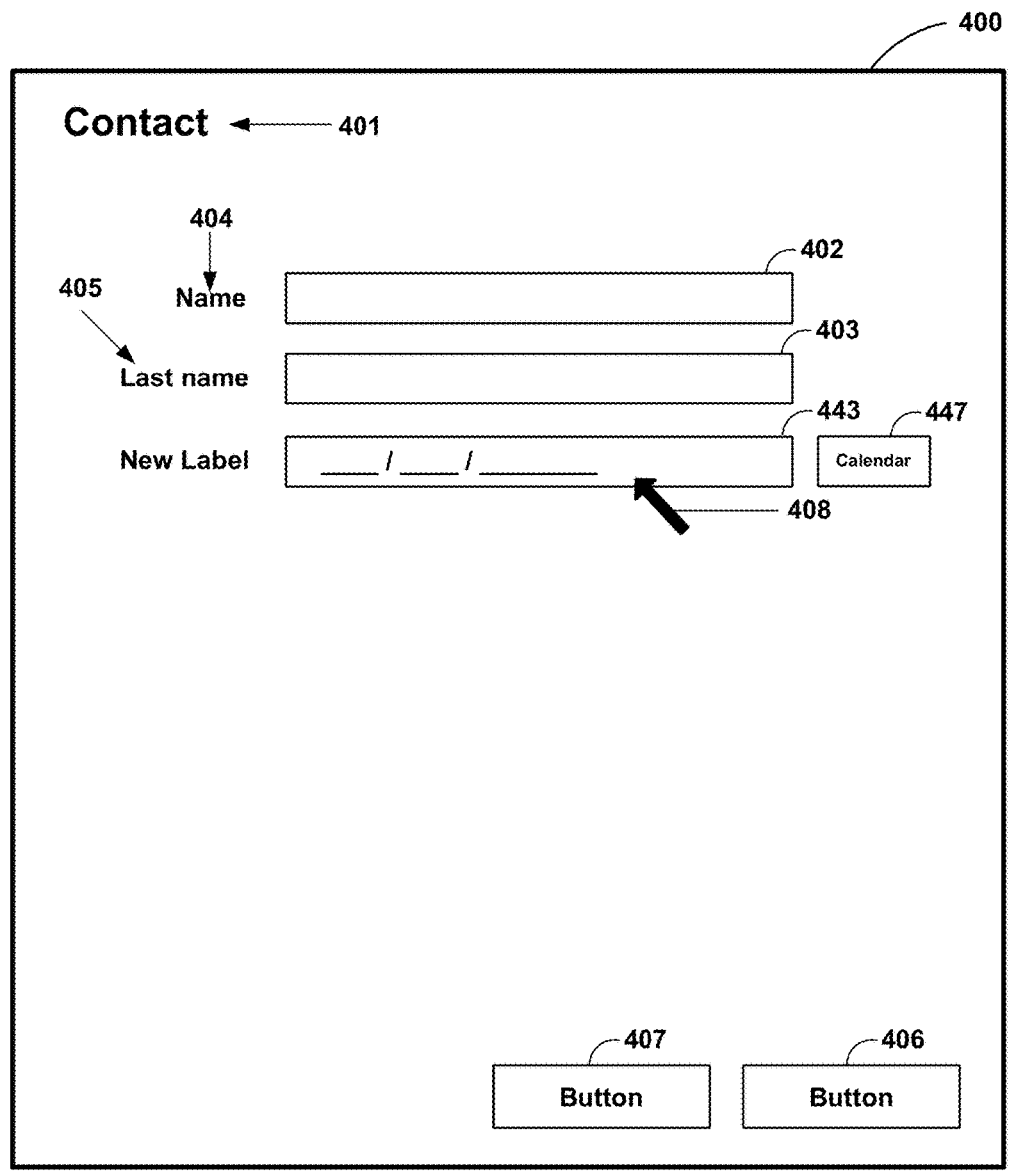

Continuing with the example shown in FIG. 4F, FIG. 4G is a screen diagram illustrating additional example details of graphical user interface 400. Upon selection of the option "Date selector" in menu 445 shown in FIG. 4F, object management module 236 and/or user interface module 234 outputs graphical object 443 as a date selector at the indicated region of graphical user interface 400 that includes the location of pointer 408, as shown in FIG. 4G. In addition, graphical object 447 is also inserted adjacent to, and to the right of, graphical object 443, given that graphical object 443 is a date selector object. Graphical object 447 comprises a calendar object. During execution of the contact application associated with graphical user interface 400, a user may select graphical object 447 to identify a date for insertion into the selection field provided by graphical object 443.

As discussed above, in various examples, object prediction module 235 may use certain guidelines or rules in determining predicted, candidate graphical objects for insertion into a graphical user interface, such as graphical user interface 400. In various examples, these guidelines or rules may be included in one or more of development specifications 230.

For non-limiting purposes of illustration only, example rules, which may be used by object prediction module 235 and included in development specifications 230, are shown in the first and second portions of pseudocode below, where the term "widget" in the pseudocode may be used interchangeably the term "graphical object" used throughout this disclosure.

The first portion of pseudocode shown below determines whether there are any potential with candidate objects for insertion based on the existence and/or location of other graphical objects:

```
// example value of a margin to leave between widgets
   during prediction int PREDICTION_GAP=8
List candidates
// example size of the prediction area
Size predictedSize
for each widget w
{
Rectangle r=boundsOf(w)
// predict right
Rectangle   c=Rectangle(r.maxX+PREDICTION_GAP,
   r.y,
predictedSize.width, predictedSize.height)
// the overlap function checks whether the candidate
   rectangle overlaps
// with any existing widget. mouseX and mouseY provide
   the current
// location coordinates of the mouse/pointer
if  c.maxX  <window.maxX  and  c.contains(mouseX,
   mouseY) and !overlap(c)
// record the bounds of the candidates, the type of widget
   that lead to
//its inference and on what side of the source widget the
   candidate  is  candidates.add(Candidate(c, typeOf(w),
   PredictionDirection.RIGHT) continue
}
// do similar work to predict top, bottom and left
```

}
// sort prediction candidates by direction (in this order: right, left,
// bottom, top)
sort(candidates)
// pick the first candidate (e.g., the most plausible)
Candidate candidate=candidates[0]
showCandidate(candidate)

In this first portion of pseudocode above, for each existing graphical object (or "widget") that is currently output for display in the graphical user interface, the pseudocode determines whether one or more new, candidate objects, having specified sizes, could be inserted to the right of, to the left of, above, or below the respective existing graphical object. The pseudocode also determines whether the candidate object (e.g., a rectangular-shaped object in this particular example) would overlap with any other existing object currently output for display. If a given potential candidate object would fit within the graphical user interface, at a region of the graphical user interface that includes the current location of the mouse/pointer, and if this potential candidate object does not overlap with another existing object, the pseudocode adds this object to a list of candidate objects for insertion. When adding the candidate object to the list, the pseudocode may store information related to the type of the currently existing object on which the candidate object is based (e.g., via the 'typeOf' parameter), and also the direction at which the candidate object is located relative to this existing object.

The pseudocode may also sort the candidate objects in this list, such as sorting the candidate objects based on the orientation or location of the candidate objects relative to other objects in the graphical user interface. In some cases, the candidate objects in the list may be sorted based on confidence values that are associated with each of the candidate objects, as described above. The pseudocode then outputs a particular candidate object for display. However, in some cases, as described previously, multiple different candidate objects may be output for display in a list or menu, such as shown in FIG. 4F.

A second portion of pseudocode shown below provides additional details of determining, after one or more candidate objects have been identified, what action to take once a particular candidate object has been selected or confirmed (e.g., by application developer):

switch candidate.sourceWidgetType {
case Label:
    switch candidate.direction
    {
    // when adding to the top/bottom/left of a label, always add
    // another label
    case TOP, BOTTOM, LEFT: addLabelWidget(candidate)
    // when adding to the right of a label, let the user choose from
    // a list
    case RIGHT: chooseWidgetToAdd(candidate,{Label, CheckBox, RadioButton, Button})
    }
// etc., other 'case' clauses for other source widget types (e.g.,
// CheckBox, RadioButton, Button) of the given candidate object
}

In this second portion of pseudocode, the pseudocode uses a 'switch' statement to determine the type of the source object that already currently exists in the graphical user interface and that led to the prediction of this particular candidate object. This object type was previously stored when the candidate object was added to the list of candidates in the first portion of pseudocode above (e.g., via the 'typeOf' parameter). In this example, if the existing source object is a Label object, the pseudocode includes a further 'switch' statement to determine the direction at which the candidate graphical object is located relative to this existing object. If the candidate object is located adjacent to, and either to the top, bottom, or left of the existing Label object, the pseudocode determines that the candidate object is another Label object that can be inserted to the top, bottom, or left, respectively, of the existing object. For example, referring to the example of FIG. 4E, the pseudocode may determine to insert candidate object 441 as a label object, given that object 441 is located below graphical object 405, which is also a label object.

On the other hand, if the candidate object is located adjacent to, but to the right, of the existing Label object, the pseudocode determines to output a menu (e.g., such as shown in the example of FIG. 4F) and enables the application developer to choose the type of the candidate object from a list. In the example of this pseudocode, the options for the type of object that may be selected by the developer are a Label object, a Check Box object, a Radio Button object, or a Button object.

Based on the original switch statement, this second portion of pseudocode may be extended make similar determinations according to the value of sourcewidgetType associated with a given candidate object. Thus, the pseudocode may be extended to determine if a particular candidate object is located to the top, bottom, left, or right of other types of existing objects, such as an existing checkbox object, an existing radio button object, or an existing button object, and determine the corresponding type of the candidate object for insertion into the graphical user interface. For example, referring back to the example of FIG. 4C, the pseudocode may determine to insert candidate object 407 as a button object, given that object 407 is located to the left of object 406, which is a button object.

Figure 5:
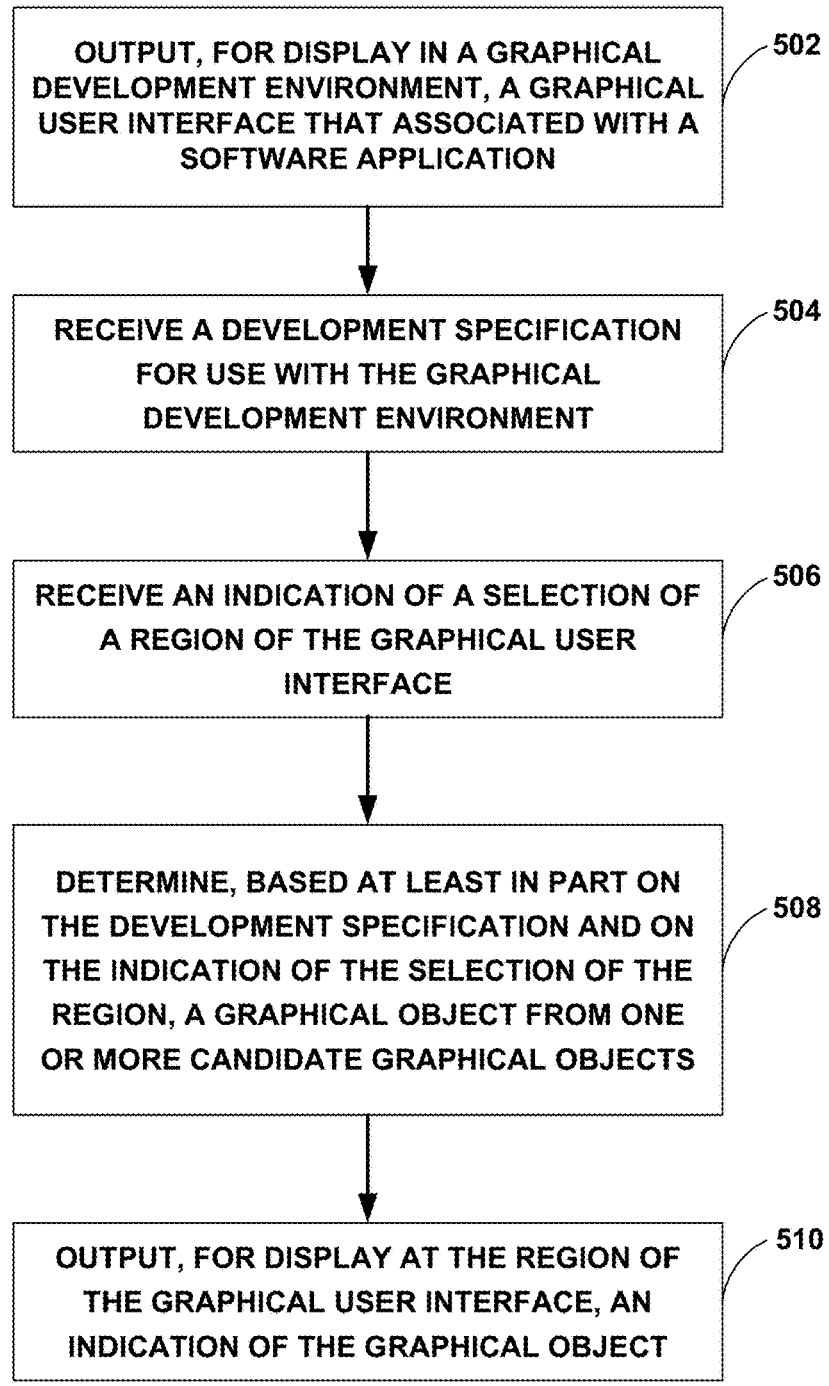
FIG. 5 is a flow diagram illustrating example operations of an example computing device that is configured to insert one or more graphical objects into a graphical user interface, in accordance with one or more aspects of the present disclosure.

FIG. 5 is a flow diagram illustrating example operations of an example computing device, such as computing 110 (FIG. 1), computing device 210 (FIG. 2), and/or computing device 310 (FIG. 3), which is configured to insert one or more graphical objects into a graphical user interface of a development environment, in accordance with one or more aspects of the present disclosure. For purposes of illustration only, FIG. 5 is described below within the example context of computing device 110 of FIG. 1.

In the flow diagram illustrated FIG. 5, a computing device (e.g., computing device 110) is configured to output (502), for display in a graphical development environment that is used during development of a software application (e.g., one of application modules 138), a graphical user interface (e.g., graphical user interface 100) that is associated with the software application. The computing device is configured to receive (504) a development specification (e.g., one of development specification 130) that associates a region of the graphical user interface with one or more candidate graphical objects for insertion into the graphical user interface.

The computing device is also configured to receive (506) an indication of a selection of the region of the graphical user interface and determine (508), based at least in part on the development specification and on the indication of the selection of the region of the graphical user interface, a graphical object (e.g., graphical object 107) from the one or more candidate graphical objects. The computing device is further configured to output (510), for display at the region of the graphical user interface, an indication of the graphical object.

The following numbered examples may illustrate one or more aspects of the present disclosure.

Example 1

A method comprising: outputting, by a computing device and for display in a graphical development environment that is used during development of a software application, a graphical user interface that is associated with the software application; receiving, by the computing device, a development specification that associates a region of the graphical user interface with one or more candidate graphical objects for insertion into the graphical user interface; receiving, by the computing device, an indication of a selection of the region of the graphical user interface; determining, by the computing device, based at least in part on the development specification and on the indication of the selection of the region of the graphical user interface, a graphical object from the one or more candidate graphical objects; and outputting, by the computing device and for display at the region of the graphical user interface, an indication of the graphical object.

Example 2

The method of Example 1, wherein outputting the indication of the graphical object comprises outputting, by the computing device and for display at the region of the graphical user interface, a preview of the graphical object as a suggested graphical object for insertion at the region of the graphical user interface, and wherein the method further comprises: receiving, by the computing device, an indication of a selection of the preview of the graphical object; and responsive to receiving the indication of the selection of the preview of the graphical object, outputting, by the computing device and for display at the region of the graphical user interface, the graphical object.

Example 3

The method of any of Examples 1-2, wherein the one or more candidate graphical objects comprises a plurality of candidate graphical objects, wherein the development specification associates the region of the graphical user interface with the plurality of candidate graphical objects, and wherein determining the graphical object from the one or more candidate graphical objects comprises: outputting, by the computing device and for display, a plurality of options, wherein each option of the plurality of options represents a respective candidate graphical object of the plurality of candidate graphical objects; and receiving, by the computing device, an indication of a selection an option from the plurality of options, wherein the selected option represents the graphical object.

Example 4

The method of Example 3, wherein each option of the plurality of options comprises a textual representation of the respective candidate graphical object of the plurality of candidate graphical objects.

Example 5

The method of any of Examples 3-4, wherein determining the graphical object from the one or more candidate graphical objects further comprises: determining, by the computing device, a plurality of confidence values, wherein each confidence value of the plurality of confidence values is associated with a respective candidate graphical object of the plurality of candidate graphical objects; and sorting, by the computing device and based on the plurality of confidence values, the plurality of options to create a sorted order of the plurality of options, wherein outputting the plurality of options comprises outputting, by the computing device and for display, the plurality of options in the sorted order.

Example 6

The method of any of Examples 1-5, wherein determining the graphical object from the one or more candidate graphical objects comprises determining, by the computing device, one or more of a type of the graphical object, a size of the graphical object, an insertion location of the graphical object, or an alignment of the graphical object relative to one or more other graphical objects in the graphical user interface, and wherein outputting the indication of the graphical object comprises outputting, by the computing device and for display at the region of the graphical user interface, the indication of the graphical object based at least in part on the one or more of the type of the graphical object, the size of the graphical object, the insertion location of the graphical object, or the alignment of the graphical object with respect to the one or more other graphical objects in the graphical user interface.

Example 7

The method of any of Examples 1-6, further comprising: determining, by the computing device, one or more adjacent graphical objects that are located within a threshold distance of the region of the graphical user interface, wherein determining the graphical object from the one or more candidate graphical objects is further based at least in part on the one or more adjacent graphical objects.

Example 8

The method of Example 7, wherein the one or more adjacent graphical objects comprise an adjacent graphical object, and wherein determining the graphical object from the one or more candidate graphical objects comprises: determining, by the computing device, a type of the adjacent graphical object; determining, by the computing device, a location of the region of the graphical user interface relative to the adjacent graphical object; and determining, by the computing device, based at least in part on the type of the adjacent graphical object and on the location of the region of the graphical user interface relative to the adjacent graphical object, a type of the graphical object.

Example 9

The method of any of Examples 7-8, wherein determining the graphical object from the one or more candidate graphical objects comprising determining, by the computing device, one or more of an insertion location of the graphical object relative to the one or more adjacent graphical objects or an alignment of the graphical object relative to the one or more adjacent graphical objects.

Example 10

The method of any of Examples 7-9, wherein the development specification identifies the graphical object based at least in part on the region of the graphical user interface and the one or more adjacent graphical objects.

Example 11

The method of any of Examples 1-10, wherein outputting the indication of the graphical object comprises outputting, by the computing device and for display at the region of the graphical user interface, the graphical object.

Example 12

The method of any of Examples 1-11, wherein the one or more candidate graphical objects each comprise one of a graphical button, a graphical checkbox, a label, an input field, or a date selector.

Example 13

A computing device, comprising: at least one processor; and a computer-readable storage device storing instructions that, when executed by the at least one processor, cause the at least one processor to: output, for display in a graphical development environment that is used during development of a software application, a graphical user interface that is associated with the software application; receive a development specification that associates a region of the graphical user interface with one or more candidate graphical objects for insertion into the graphical user interface; receive an indication of a selection of the region of the graphical user interface; determine, based at least in part on the development specification and on the indication of the selection of the region of the graphical user interface, a graphical object from the one or more candidate graphical objects; and output, for display at the region of the graphical user interface, an indication of the graphical object.

Example 14

The computing device of Example 13, wherein the instructions that cause the at least one processor to output the indication of the graphical object comprise instructions that cause the at least one processor to output, for display at the region of the graphical user interface, a preview of the graphical object as a suggested graphical object for insertion at the region of the graphical user interface, and wherein the instructions further cause the at least one processor to: receive an indication of a selection of the preview of the graphical object; and responsive to receiving the indication of the selection of the preview of the graphical object, output, for display at the region of the graphical user interface, the graphical object.

Example 15

The computing device of any of Examples 13-14, wherein the one or more candidate graphical objects comprises a plurality of candidate graphical objects, wherein the development specification associates the region of the graphical user interface with the plurality of candidate graphical objects, and wherein the instructions that cause the at least one processor to determine the graphical object from the one or more candidate graphical objects comprise instructions that cause the at least one processor to: output, for display, a plurality of options, wherein each option of the plurality of options represents a respective candidate graphical object of the plurality of candidate graphical objects; and receive an indication of a selection an option from the plurality of options, wherein the selected option represents the graphical object.

Example 16

The computing device of Example 15, wherein each option of the plurality of options comprises a textual representation of the respective candidate graphical object of the plurality of candidate graphical objects.

Example 17

The computing device of any of Examples 15-16, wherein the instructions that cause the at least one processor to determine the graphical object from the one or more candidate graphical objects further comprise instructions that cause the at least one processor to: determine a plurality of confidence values, wherein each confidence value of the plurality of confidence values is associated with a respective candidate graphical object of the plurality of candidate graphical objects; and sort, based on the plurality of confidence values, the plurality of options to create a sorted order of the plurality of options, wherein the instructions that cause the at least one processor to output the plurality of options comprise instructions that cause the at least one processor to output, for display, the plurality of options in the sorted order.

Example 18

The computing device of any of Examples 13-17, wherein the instructions that cause the at least one processor to determine the graphical object from the one or more candidate graphical objects comprise instructions that cause the at least one processor to determine one or more of a type of the graphical object, a size of the graphical object, an insertion location of the graphical object, or an alignment of the graphical object relative to one or more other graphical objects in the graphical user interface, and wherein the instructions that cause the at least one processor to output the indication of the graphical object comprise instructions that cause the at least one processor to output, for display at the region of the graphical user interface, the indication of the graphical object based at least in part on the one or more of the type of the graphical object, the size of the graphical object, the insertion location of the graphical object, or the alignment of the graphical object with respect to the one or more other graphical objects in the graphical user interface.

Example 19

The computing device of any of Examples 13-18, wherein the instructions further cause the at least one processor to: determine one or more adjacent graphical objects that are located within a threshold distance of the region of the graphical user interface, wherein the instructions that cause the at least one processor to determine the graphical object from the one or more candidate graphical objects comprise instructions that cause the at least one processor to determine the graphical object further based at least in part on the one or more adjacent graphical objects.

Example 20

The computing device of Example 19, wherein the one or more adjacent graphical objects comprise an adjacent graphical object, and wherein the instructions that cause the at least one processor to determine the graphical object from the one or more candidate graphical objects comprise instructions that cause the at least one processor to: determine a type of the adjacent graphical object; determine a location of the region of the graphical user interface relative to the adjacent graphical object; and determine, based at least in part on the type of the adjacent graphical object and on the location of the region of the graphical user interface relative to the adjacent graphical object, a type of the graphical object.

Example 21

The computing device of any of Examples 19-20, wherein the instructions that cause the at least one processor to determine the graphical object from the one or more candidate graphical objects comprise instructions that cause the at least one processor to determine one or more of an insertion location of the graphical object relative to the one or more adjacent graphical objects or an alignment of the graphical object relative to the one or more adjacent graphical objects.

Example 22

The computing device of any of Examples 19-21, wherein the development specification identifies the graphical object based at least in part on the region of the graphical user interface and the one or more adjacent graphical objects.

Example 23

The computing device of any of Examples 13-22, wherein the instructions that cause the at least one processor to output the indication of the graphical object comprise instructions that cause the at least one processor to output, for display at the region of the graphical user interface, the graphical object.

Example 24

The computing device of any of Examples 13-23, wherein the one or more candidate graphical objects each comprise one of a graphical button, a graphical checkbox, a label, an input field, or a date selector.

Example 25

A computing device comprising means for performing the method of any of Examples 1-12.

Example 26

A computer-readable storage device storing instructions that, when executed by at least one processor of a computing device, cause the at least one processor to perform operations comprising: outputting, for display in a graphical development environment that is used during development of a software application, a graphical user interface that is associated with the software application; receiving a development specification that associates a region of the graphical user interface with one or more candidate graphical objects for insertion into the graphical user interface; receiving an indication of a selection of the region of the graphical user interface; determining, based at least in part on the development specification and on the indication of the selection of the region of the graphical user interface, a graphical object from the one or more candidate graphical objects; and outputting, for display at the region of the graphical user interface, an indication of the graphical object.

Example 27

The computer-readable storage device of Example 26, wherein outputting the indication of the graphical object comprises outputting, for display at the region of the graphical user interface, a preview of the graphical object as a suggested graphical object for insertion at the region of the graphical user interface, and wherein the operations further comprise: receiving an indication of a selection of the preview of the graphical object; and responsive to receiving the indication of the selection of the preview of the graphical object, outputting, for display at the region of the graphical user interface, the graphical object.

Example 28

The computer-readable storage device of any of Examples 26-27, wherein the one or more candidate graphical objects comprises a plurality of candidate graphical objects, wherein the development specification associates the region of the graphical user interface with the plurality of candidate graphical objects, and wherein determining the graphical object from the one or more candidate graphical objects comprises: outputting, for display, a plurality of options, wherein each option of the plurality of options represents a respective candidate graphical object of the plurality of candidate graphical objects; and receiving an indication of a selection an option from the plurality of options, wherein the selected option represents the graphical object.

Example 29

The computer-readable storage device of Example 28, wherein each option of the plurality of options comprises a textual representation of the respective candidate graphical object of the plurality of candidate graphical objects.

Example 30

The computer-readable storage device of any of Examples 28-29, wherein determining the graphical object from the one or more candidate graphical objects further comprises: determining a plurality of confidence values, wherein each confidence value of the plurality of confidence values is associated with a respective candidate graphical object of the plurality of candidate graphical objects; and sorting, based on the plurality of confidence values, the plurality of options to create a sorted order of the plurality of options, wherein outputting the plurality of options comprises outputting, for display, the plurality of options in the sorted order.

Example 31

The computer-readable storage device of any of Examples 26-30, wherein determining the graphical object from the one or more candidate graphical objects comprises determining one or more of a type of the graphical object, a size of the graphical object, an insertion location of the graphical object, or an alignment of the graphical object relative to one or more other graphical objects in the graphical user interface, and wherein outputting the indication of the graphical object comprises outputting, for display at the region of the graphical user interface, the indication of the graphical object based at least in part on the one or more of the type of the graphical object, the size of the graphical object, the insertion location of the graphical object, or the alignment of the graphical object with respect to the one or more other graphical objects in the graphical user interface.

Example 32

The computer-readable storage device of any of Examples 26-31, wherein the operations further comprise: determining one or more adjacent graphical objects that are located within a threshold distance of the region of the graphical user interface, wherein determining the graphical object from the one or more candidate graphical objects is further based at least in part on the one or more adjacent graphical objects.

Example 33

The computer-readable storage device of Example 32, wherein the one or more adjacent graphical objects comprise an adjacent graphical object, and wherein determining the graphical object from the one or more candidate graphical objects comprises: determining a type of the adjacent graphical object; determining a location of the region of the graphical user interface relative to the adjacent graphical object; and determining, based at least in part on the type of the adjacent graphical object and on the location of the region of the graphical user interface relative to the adjacent graphical object, a type of the graphical object.

Example 34

The computer-readable storage device of any of Examples 32-33, wherein determining the graphical object from the one or more candidate graphical objects comprising determining, by the computing device, one or more of an insertion location of the graphical object relative to the one or more adjacent graphical objects or an alignment of the graphical object relative to the one or more adjacent graphical objects.

Example 35

The computer-readable storage device of any of Examples 32-34, wherein the development specification identifies the graphical object based at least in part on the region of the graphical user interface and the one or more adjacent graphical objects.

Example 36

The computer-readable storage device of any of Examples 26-35, wherein outputting the indication of the graphical object comprises outputting, for display at the region of the graphical user interface, the graphical object.

Example 37

The computer-readable storage device of any of Examples 26-36, wherein the one or more candidate graphical objects each comprise one of a graphical button, a graphical checkbox, a label, an input field, or a date selector.

Example 38

A computer-readable storage device storing instructions that, when executed by at least one processor of a computing device, cause the at least one processor to perform the method of any of Examples 1-12.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   outputting, by a computing device and for display in a graphical development environment that is used during development of a software application, a graphical user interface that is associated with the software application;
   receiving, by the computing device, a development specification that associates a region of the graphical user interface with one or more candidate graphical objects for insertion into the graphical user interface;
   receiving, by the computing device, an indication of a selection of the region of the graphical user interface;
   determining, by the computing device, one or more adjacent graphical objects that are located within a threshold distance of the region of the graphical user interface;
   determining, by the computing device, a graphical object from the one or more candidate graphical objects, wherein determining the graphical object is based at least in part on (i) the development specification, (ii) the indication of the selection of the region of the graphical user interface, and (iii) the one or more adjacent graphical objects that are located within the threshold distance of the region; and
   outputting, by the computing device and for display at the region of the graphical user interface, an indication of the graphical object.

2. The method of claim 1,
   wherein outputting the indication of the graphical object comprises outputting, by the computing device and for display at the region of the graphical user interface, a preview of the graphical object as a suggested graphical object for insertion at the region of the graphical user interface, and
   wherein the method further comprises:
      receiving, by the computing device, an indication of a selection of the preview of the graphical object; and
      responsive to receiving the indication of the selection of the preview of the graphical object, outputting, by the computing device and for display at the region of the graphical user interface, the graphical object.

3. The method of claim 1,
   wherein the one or more candidate graphical objects comprises a plurality of candidate graphical objects,
   wherein the development specification associates the region of the graphical user interface with the plurality of candidate graphical objects, and
   wherein determining the graphical object from the one or more candidate graphical objects comprises:
      outputting, by the computing device and for display, a plurality of options, wherein each option of the plurality of options represents a respective candidate graphical object of the plurality of candidate graphical objects; and
      receiving, by the computing device, an indication of a selection an option from the plurality of options, wherein the selected option represents the graphical object.

4. The method of claim 3, wherein each option of the plurality of options comprises a textual representation of the respective candidate graphical object of the plurality of candidate graphical objects.

5. The method of claim 3, wherein determining the graphical object from the one or more candidate graphical objects further comprises:
   determining, by the computing device, a plurality of confidence values, wherein each confidence value of the plurality of confidence values is associated with a respective candidate graphical object of the plurality of candidate graphical objects; and
   sorting, by the computing device and based on the plurality of confidence values, the plurality of options to create a sorted order of the plurality of options,
   wherein outputting the plurality of options comprises outputting, by the computing device and for display, the plurality of options in the sorted order.

6. The method of claim 1,
   wherein determining the graphical object from the one or more candidate graphical objects comprises determining, by the computing device, one or more of a type of the graphical object, a size of the graphical object, an insertion location of the graphical object, or an alignment of the graphical object relative to one or more other graphical objects in the graphical user interface, and
   wherein outputting the indication of the graphical object comprises outputting, by the computing device and for display at the region of the graphical user interface, the indication of the graphical object based at least in part on the one or more of the type of the graphical object, the size of the graphical object, the insertion location of the graphical object, or the alignment of the graphical object with respect to the one or more other graphical objects in the graphical user interface.

7. The method of claim 1,
   wherein the one or more adjacent graphical objects comprise an adjacent graphical object, and
   wherein determining the graphical object from the one or more candidate graphical objects comprises:
      determining, by the computing device, a type of the adjacent graphical object;
      determining, by the computing device, a location of the region of the graphical user interface relative to the adjacent graphical object; and
      determining, by the computing device, based at least in part on the type of the adjacent graphical object and on the location of the region of the graphical user interface relative to the adjacent graphical object, a type of the graphical object.

8. The method of claim 1, wherein determining the graphical object from the one or more candidate graphical objects comprising determining, by the computing device, one or more of an insertion location of the graphical object relative to the one or more adjacent graphical objects or an alignment of the graphical object relative to the one or more adjacent graphical objects.

9. The method of claim 1, wherein the development specification identifies the graphical object based at least in part on the region of the graphical user interface and the one or more adjacent graphical objects.

10. The method of claim 1, wherein outputting the indication of the graphical object comprises outputting, by the computing device and for display at the region of the graphical user interface, the graphical object.

11. The method of claim 1, wherein the one or more candidate graphical objects each comprise one of a graphical button, a graphical checkbox, a label, an input field, or a date selector.

12. A computing device, comprising:
at least one processor; and
a computer-readable storage device storing instructions that, when executed by the at least one processor, cause the at least one processor to:
output, for display in a graphical development environment that is used during development of a software application, a graphical user interface that is associated with the software application;
receive a development specification that associates a region of the graphical user interface with one or more candidate graphical objects for insertion into the graphical user interface;
receive an indication of a selection of the region of the graphical user interface;
determine one or more adjacent graphical objects that are located within a threshold distance of the region of the graphical user interface;
determine a graphical object from the one or more candidate graphical objects, wherein determining the graphical object is based at least in part on (i) the development specification, (ii) the indication of the selection of the region of the graphical user interface, and (iii) the one or more adjacent graphical objects that are located within the threshold distance of the region; and
output, for display at the region of the graphical user interface, an indication of the graphical object.

13. The computing device of claim 12,
wherein the one or more candidate graphical objects comprises a plurality of candidate graphical objects,
wherein the development specification associates the region of the graphical user interface with the plurality of candidate graphical objects, and
wherein the instructions that cause the at least one processor to determine the graphical object from the one or more candidate graphical objects comprise instructions that cause the at least one processor to:
output, for display, a plurality of options, wherein each option of the plurality of options represents a respective candidate graphical object of the plurality of candidate graphical objects; and
receive an indication of a selection an option from the plurality of options, wherein the selected option represents the graphical object.

14. The computing device of claim 13, wherein the instructions that cause the at least one processor to determine the graphical object from the one or more candidate graphical objects further comprise instructions that cause the at least one processor to:
determine a plurality of confidence values, wherein each confidence value of the plurality of confidence values is associated with a respective candidate graphical object of the plurality of candidate graphical objects; and
sort, based on the plurality of confidence values, the plurality of options to create a sorted order of the plurality of options,
wherein the instructions that cause the at least one processor to output the plurality of options comprise instructions that cause the at least one processor to output, for display, the plurality of options in the sorted order.

15. The computing device of claim 12,
wherein the one or more adjacent graphical objects comprise an adjacent graphical object, and
wherein the instructions that cause the at least one processor to determine the graphical object from the one or more candidate graphical objects comprise instructions that cause the at least one processor to:
determine a type of the adjacent graphical object;
determine a location of the region of the graphical user interface relative to the adjacent graphical object; and
determine, based at least in part on the type of the adjacent graphical object and on the location of the region of the graphical user interface relative to the adjacent graphical object, a type of the graphical object.

16. A computer-readable storage device storing instructions that, when executed by at least one processor of a computing device, cause the at least one processor to perform operations comprising:
outputting, for display in a graphical development environment that is used during development of a software application, a graphical user interface that is associated with the software application;
receiving a development specification that associates a region of the graphical user interface with one or more candidate graphical objects for insertion into the graphical user interface;
receiving an indication of a selection of the region of the graphical user interface;
determining one or more adjacent graphical objects that are located within a threshold distance of the region of the graphical user interface;
determining a graphical object from the one or more candidate graphical objects, wherein determining the graphical object is based at least in part on (i) the development specification, (ii) the indication of the selection of the region of the graphical user interface, and (iii) the one or more adjacent graphical objects that are located within the threshold distance of the region; and
outputting, for display at the region of the graphical user interface, an indication of the graphical object.

17. The computer-readable storage device of claim 16,
wherein the one or more candidate graphical objects comprises a plurality of candidate graphical objects,
wherein the development specification associates the region of the graphical user interface with the plurality of candidate graphical objects, and
wherein determining the graphical object from the one or more candidate graphical objects comprises:
outputting, for display, a plurality of options, wherein each option of the plurality of options represents a respective candidate graphical object of the plurality of candidate graphical objects; and
receiving an indication of a selection an option from the plurality of options, wherein the selected option represents the graphical object.

18. The computer-readable storage device of claim 17, wherein determining the graphical object from the one or more candidate graphical objects further comprises:

determining a plurality of confidence values, wherein each confidence value of the plurality of confidence values is associated with a respective candidate graphical object of the plurality of candidate graphical objects; and sorting, based on the plurality of confidence values, the plurality of options to create a sorted order of the plurality of options, wherein outputting the plurality of options comprises outputting, for display, the plurality of options in the sorted order.

19. The computer-readable storage device of claim 16, wherein the one or more adjacent graphical objects comprise an adjacent graphical object, and wherein determining the graphical object from the one or more candidate graphical objects comprises:

determining a type of the adjacent graphical object;

determining a location of the region of the graphical user interface relative to the adjacent graphical object; and determining, based at least in part on the type of the adjacent graphical object and on the location of the region of the graphical user interface relative to the adjacent graphical object, a type of the graphical object.

* * * * *